(12) United States Patent
Thornburg et al.

(10) Patent No.: US 11,725,093 B2
(45) Date of Patent: Aug. 15, 2023

(54) BIODERIVED HEAT TRANSFER FLUIDS AND METHODS OF MAKING THE SAME

(71) Applicant: Alliance for Sustainable Energy, LLC, Golden, CO (US)

(72) Inventors: Nicholas Earl Thornburg, Denver, CO (US); Jacob S. Kruger, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 412 days.

(21) Appl. No.: 17/008,864

(22) Filed: Sep. 1, 2020

(65) Prior Publication Data
US 2021/0261749 A1   Aug. 26, 2021

Related U.S. Application Data

(60) Provisional application No. 62/897,477, filed on Sep. 9, 2019.

(51) Int. Cl.
| | |
|---|---|
| *C08J 11/22* | (2006.01) |
| *B01D 3/14* | (2006.01) |
| *B01D 3/42* | (2006.01) |
| *B01D 5/00* | (2006.01) |
| *B01D 11/04* | (2006.01) |
| *C07G 1/00* | (2011.01) |

(52) U.S. Cl.
CPC .............. *C08J 11/22* (2013.01); *B01D 3/14* (2013.01); *B01D 3/4227* (2013.01); *B01D 5/006* (2013.01); *B01D 5/009* (2013.01); *B01D 11/0488* (2013.01); *B01D 11/0492* (2013.01); *C07G 1/00* (2013.01); *C08J 2397/00* (2013.01)

(58) Field of Classification Search
CPC ............... C08J 11/22; B01D 3/14; C07G 1/00
See application file for complete search history.

(56) References Cited

U.S. PATENT DOCUMENTS

2011/0258147 A1   10/2011   Low

OTHER PUBLICATIONS

Anderson et al., "Reductive Catalytic Fractionation of Corn Stover Lignin", ACS Sustainable Chemistry & Engineering, 2016, vol. 4, pp. 6940-6950.
Dellon et al., "Computational Generation of Lignin Libraries from Diverse Biomass Sources", Energy & Fuels, 2017, vol. 31, pp. 8263-8274.
Van Den Bosch et al., "Integrating lignin valorization and bio-ethanol production: on the role of Ni-Al2O3 catalyst pellets during lignin-first fractionation", Green Chemistry, 2017, vol. 19, pp. 3313-3326.
Vermaas et al., "Automated Transformation of Lignin Topologies into Atomic Structures with LigninBuilder", ACS Sustainable Chemistry & Engineering, 2019, vol. 7, No. 3, pp. 3443 3453.

*Primary Examiner* — Sikarl A Witherspoon
(74) *Attorney, Agent, or Firm* — Michael A. McIntyre

(57) ABSTRACT

The present disclosure relates to a composition that includes a lignin-derived mixture that includes at least one of a dimer, a trimer, and/or a tetramer, where the composition is characterized by a thermal stability up to a maximum temperature between about 260° C. and about 300° C.

23 Claims, 8 Drawing Sheets

Dimers

| # | Compound Name (IUPAC preferred) | Linkage | MW (Da) |
|---|---|---|---|
| 1 | 4-[(1E)-2-(4-hydroxy-3-methoxyphenyl)ethenyl]-2,6-dimethoxyphenol | β-1' | 302 |
| 2 | 4-[2-(4-hydroxy-3-methoxyphenyl)ethyl]-2,6-dimethoxyphenol | β-1' | 304 |
| 3 | 4-[2-(4-hydroxy-3,5-dimethoxyphenyl)ethyl]-2,6-dimethoxyphenol | β-1' | 334 |
| 4 | 4-[3-hydroxy-2-(4-hydroxy-3,5-dimethoxyphenyl)propyl]-2,6-dimethoxyphenol | β-1' | 364 |
| 5 | 2,6-dimethoxy-4-{7-methoxy-5-[(1E)-prop-1-en-1-yl]-2,3-dihydro-1-benzofuran-2-yl}phenol | β-5' | 342 |
| 6 | 2-[1-hydroxy-3-(4-hydroxy-3-methoxyphenyl)propan-2-yl]-6-methoxy-4-[(1E)-prop-1-en-1-yl]phenol | β-5' | 344 |
| 7 | 2,6-dimethoxy-4-(7-methoxy-5-propyl-2,3-dihydro-1-benzofuran-2-yl)phenol | β-5' | 344 |
| 8 | 2-[2-(4-hydroxy-3,5-dimethoxyphenyl)ethyl]-6-methoxy-4-propylphenol | β-5' | 346 |
| 9 | 2-[1-hydroxy-3-(4-hydroxy-3-methoxyphenyl)propan-2-yl]-6-methoxy-4-propylphenol | β-5' | 346 |
| 10 | 2,6-dimethoxy-4-(7-methoxy-3-methyl-5-propyl-2,3-dihydro-1-benzofuran-2-yl)phenol | β-5' | 353 |
| 11 | 2-[1-hydroxy-3-(4-hydroxy-3-methoxyphenyl)propan-2-yl]-4-(3-hydroxypropyl)-6-methoxyphenol | β-5' | 362 |
| 12 | 4-[3-(hydroxymethyl)-7-methoxy-5-propyl-2,3-dihydro-1-benzofuran-2-yl]-2,6-dimethoxyphenol | β-5' | 374 |
| 13 | 4-{3-hydroxy-2-{2-hydroxy-3-methoxy-5-[(1E)-prop-1-en-1-yl]phenyl}propyl)-2,6-dimethoxyphenol | β-5' | 374 |
| 14 | 4-[3-hydroxy-2-(2-hydroxy-3-methoxy-5-propylphenyl)propyl]-2,6-dimethoxyphenol | β-5' | 376 |
| 15 | 4-{3-hydroxy-2-[2-hydroxy-5-(3-hydroxypropyl)-3-methoxyphenyl]propyl}-2,6-dimethoxyphenol | β-5' | 392 |
| 16 | 5,5'-diethyl-3,3'-dimethoxy-[1,1'-biphenyl]-2,2'-diol | 5-5' | 302 |
| 17 | 5-ethyl-3,3'-dimethoxy-5'-propyl-[1,1'-biphenyl]-2,2'-diol | 5-5' | 316 |
| 18 | 3,3'-dimethoxy-5,5'-bis[(1E)-prop-1-en-1-yl]-[1,1'-biphenyl]-2,2'-diol | 5-5' | 326 |
| 19 | 3,3'-dimethoxy-5-[(1E)-prop-1-en-1-yl]-5'-propyl-[1,1'-biphenyl]-2,2'-diol | 5-5' | 328 |
| 20 | 3,3'-dimethoxy-5,5'-dipropyl-[1,1'-biphenyl]-2,2'-diol | 5-5' | 330 |
| 21 | 2-methoxy-4-[1-(2-methoxy-4-propylphenoxy)propyl]phenol | α-O-4' | 330 |
| 22 | 4-[1-(2,6-dimethoxy-4-propylphenoxy)propyl]-2-methoxyphenol | α-O-4' | 360 |
| 23 | 4-{1-[4-(3-hydroxypropyl)-2-methoxyphenoxy]propyl}-2,6-dimethoxyphenol | α-O-4' | 376 |
| 24 | 4-[1-(2,6-dimethoxy-4-propylphenoxy)propyl]-2,6-dimethoxyphenol | α-O-4' | 390 |
| 25 | 4-{2-{2,6-dimethoxy-4-[(1E)-prop-1-en-1-yl]phenoxy}-1-hydroxyethyl]-2,6-dimethoxyphenol | β-O-4' | 390 |
| 26 | 4-[2-(2,6-dimethoxy-4-propylphenoxy)-1-hydroxyethyl]-2,6-dimethoxyphenol | β-O-4' | 392 |
| 27 | 2-methoxy-6-(2-methoxy-4-propylphenoxy)-4-propylphenol | 4-O-5' | 330 |
| 28 | 2-[4-(3-hydroxypropyl)-2-methoxyphenoxy]-6-methoxy-4-propylphenol | 4-O-5' | 346 |
| 29 | 2-(2,6-dimethoxy-4-propylphenoxy)-6-methoxy-4-propylphenol | 4-O-5' | 360 |
| 30 | 4-[4-(4-hydroxy-3,5-dimethoxyphenyl)-hexahydrofuro[3,4-c]furan-1-yl]-2,6-dimethoxyphenol | β-β' | 418 |

Figure 4

Dimers

| # | Compound Name (IUPAC preferred) | Linkage | MW (Da) |
|---|---|---|---|
| 31 | [(1E)-2-phenylethenyl]benzene | β-1' | 180 |
| 32 | (2-phenylethyl)benzene | β-1' | 182 |
| 33 | (2-phenylpropyl)benzene | β-1' | 196 |
| 34 | 4-[(1E)-2-(4-hydroxyphenyl)ethenyl]phenol | β-1' | 212 |
| 35 | 4-[2-(4-hydroxyphenyl)ethyl]phenol | β-1' | 214 |
| 36 | 4-[2-(4-hydroxyphenyl)propyl]phenol | β-1' | 228 |
| 37 | 1-(2-phenylethyl)-3-[(1E)-prop-1-en-1-yl]benzene | β-5' | 222 |
| 38 | 1-(2-phenylethyl)-3-propylbenzene | β-5' | 224 |
| 39 | 4-{2-{3-[(1E)-prop-1-en-1-yl]phenyl}ethyl}phenol | β-5' | 238 |
| 40 | 1-(1-phenylpropan-2-yl)-3-propylbenzene | β-5' | 238 |
| 41 | 4-[2-(3-propylphenyl)ethyl]phenol | β-5' | 240 |
| 42 | 2-[1-(4-hydroxyphenyl)propan-2-yl]-4-propylphenol | β-5' | 270 |
| 43 | 3,3'-diethyl-1,1'-biphenyl | 5-5' | 210 |
| 44 | 3-ethyl-3'-propyl-1,1'-biphenyl | 5-5' | 224 |
| 45 | 3,3'-dipropyl-1,1'-biphenyl | 5-5' | 238 |
| 46 | 5,5'-diethyl-[1,1'-biphenyl]-2,2'-diol | 5-5' | 242 |
| 47 | 5-ethyl-5'-propyl-[1,1'-biphenyl]-2,2'-diol | 5-5' | 256 |
| 48 | 5,5'-dipropyl-[1,1'-biphenyl]-2,2'-diol | 5-5' | 270 |
| 49 | 1-propyl-3-(4-propylphenoxy)benzene | 4-O-5' | 254 |
| 50 | 4-propyl-2-(4-propylphenoxy)phenol | 4-O-5' | 270 |
| 51 | (2,3-dimethyl-4-phenylbutyl)benzene | β-β' | 238 |
| 52 | 4-[4-(4-hydroxyphenyl)-2,3-dimethylbutyl]phenol | β-β' | 270 |

Figure 5

Trimers

| # | Compound Name (IUPAC preferred) | Linkages | MW (Da) |
|---|---|---|---|
| 53 | 4-[4-[4-hydroxy-3,5-dimethoxyphenyl]-hexahydrofuro[3,4-c]furan-1-yl]-2-methoxy-6-(2-methoxy-4-propylphenoxy)phenol | β-β', 4-O-5' | 552 |
| 54 | 4-[1-[4-[1-(2,6-dimethoxy-4-propylphenoxy)propyl]-2,6-dimethoxyphenoxy]propyl]-2-methoxyphenol | α-O-4', α-O-4' | 555 |
| 55 | 2,6-dimethoxy-4-[7-methoxy-5-[1-(2-methoxy-4-propylphenoxy)propyl]-3-methyl-2,3-dihydro-1-benzofuran-2-yl]phenol | α-O-4', β-5' | 523 |
| 56 | 5-[4-[4-hydroxy-3-methoxyphenyl]-hexahydrofuro[3,4-c]furan-1-yl]-3,3-dimethoxy-5'-propyl-[1,1'-biphenyl]-2,2'-diol | 5-5', β-β' | 523 |
| 57 | 3,3'-dimethoxy-5-[7-methoxy-3-methyl-5-propyl-2,3-dihydro-1-benzofuran-2-yl]-5'-propyl-[1,1'-biphenyl]-2,2'-diol | 5-5', β-5' | 493 |
| 58 | 4-[1-(2,6-dimethoxy-4-propylphenoxy)propyl]-2-methoxy-6-(2-methoxy-4-propylphenoxy)phenol | 4-O-5', α-O-4' | 525 |
| 59 | 4-[4-[4-hydroxy-3-methoxy-5-propylphenoxy]-3,5-dimethoxyphenyl]-hexahydrofuro[3,4-c]furan-1-yl]-2,6-dimethoxyphenol | 4-O-5', β-5' | 583 |
| 60 | 4-[1-[4-hydroxy-3-methoxy-5-propylphenyl]propan-2-yl]-2-methoxy-6-(2-methoxy-4-propylphenoxy)phenol | 4-O-5', β-β' | 453 |
| 61 | 5-[1-[4-hydroxy-3,5-dimethoxyphenyl]propan-2-yl]-3,3'-dimethoxy-5'-propyl-[1,1'-biphenyl]-2,2'-diol | 5-5', β-1' | 483 |
| 62 | 5-[1-(2,5-dimethoxy-4-propylphenoxy)propyl]-3,3'-dimethoxy-5'-propyl-[1,1'-biphenyl]-2,2'-diol | 5-5', α-O-4' | 525 |
| 63 | 2-[4-[2-[4-hydroxy-3,5-dimethoxyphenyl]propyl]-2-methoxyphenoxy]-6-methoxy-4-propylphenol | 4-O-5', β-1' | 483 |
| 64 | 4-[1-[4-[1-(4-hydroxy-3-methoxyphenyl)propan-2-yl]-3,5-dimethoxyphenoxy]propan-2-yl]-2,6-dimethoxyphenol | 4-O-5', β-1' | 483 |
| 65 | 4-[5-[1-(2,6-dimethoxy-4-propylphenoxy)propyl]-7-methoxy-3-methyl-2,3-dihydro-1-benzofuran-2-yl]-2,6-dimethoxyphenol | α-O-4', β-5' | 553 |
| 66 | 2-methoxy-4-[7-methoxy-5-[7-methoxy-3-methyl-5-propyl-2,3-dihydro-1-benzofuran-2-yl]-3-methyl-2,3-dihydro-1-benzofuran-2-yl]phenol | β-5', β-5' | 491 |
| 67 | 4-[2-[4-hydroxy-3-methoxy-5-[2-methoxy-4-propylphenoxy)phenyl]propyl]-2,6-dimethoxyphenol | 4-O-5', β-1' | 483 |
| 68 | 4-[1-[2,6-dimethoxy-4-[7-methoxy-5-propyl-2,3-dihydro-1-benzofuran-2-yl]phenoxy]propyl]-2-methoxyphenol | α-O-4', β-5' | 523 |
| 69 | 5-[4-[4-hydroxy-3,5-dimethoxyphenyl]-hexahydrofuro[3,4-c]furan-1-yl]-3,3'-dimethoxy-5'-propyl-[1,1'-biphenyl]-2,2'-diol | 5-5', β-β' | 553 |
| 70 | 2-[2,6-dimethoxy-4-[7-methoxy-3-methyl-5-propyl-2,3-dihydro-1-benzofuran-2-yl]phenoxy]-6-methoxy-4-propylphenol | 4-O-5', β-5' | 523 |
| 71 | 4-[5-[2-[4-hydroxy-3,5-dimethoxyphenoxy]propyl]-3,3'-dimethoxy-5'-propyl-[1,1'-biphenyl]-2,2'-diol | β-1', β-5' | 481 |
| 72 | 4-[1-[4-[1-(2,5-dimethoxy-4-propylphenoxy)propyl]-2-methoxyphenoxy]propyl]-2,6-dimethoxyphenol | α-O-4', α-O-4' | 555 |
| 73 | 2-(2,6-dimethoxy-4-propylphenoxy)-4-[1-(4-hydroxy-3-methoxyphenyl)propan-2-yl]-6-methoxyphenol | 4-O-5', β-1' | 483 |
| 74 | 2-(2,6-dimethoxy-4-propylphenoxy)-6-methoxy-4-[7-methoxy-5-propyl-2,3-dihydro-1-benzofuran-2-yl]phenol | 4-O-5', β-5' | 523 |
| 75 | 2-[4-[2-[4-hydroxy-3,5-dimethoxyphenoxy]propyl]-2,6-dimethoxyphenoxy]-6-methoxy-4-propylphenol | 4-O-5', β-1' | 513 |
| 76 | 5-[2-[4-hydroxy-3,5-dimethoxyphenoxy]propyl]-3,3'-dimethoxy-5'-propyl-[1,1'-biphenyl]-2,2'-diol | 5-5', β-1' | 483 |
| 77 | 4-[2-[4-[2-hydroxy-3-methoxy-5-propylphenoxy]-3,5-dimethoxyphenoxy]propyl]-2,6-dimethoxyphenol | 4-O-5', β-1' | 513 |
| 78 | 2-[2,6-dimethoxy-4-propylphenoxy]-6-methoxy-4-propylphenol | 4-O-5', 4-O-5' | 525 |
| 79 | 5-[2-[4-hydroxy-3-methoxyphenoxy]propyl]-3,3'-dimethoxy-5'-propyl-[1,1'-biphenyl]-2,2'-diol | 5-5', β-1' | 453 |
| 80 | 2-[4-[2-[4-hydroxy-3-methoxyphenoxy]propyl]-2-methoxyphenoxy]-6-methoxy-4-propylphenol | 4-O-5', β-1' | 453 |
| 81 | 4-[1-[4-[1-(2,6-dimethoxy-4-propylphenoxy)propyl]-2-methoxyphenoxy]propan-2-yl]-2-methoxyphenol | 4-O-5', α-O-4' | 525 |
| 82 | 4-[4-[3-[2,6-dimethoxy-4-propylphenoxy]-4-hydroxy-5-methoxyphenyl]-hexahydrofuro[3,4-c]furan-1-yl]-2,6-dimethoxyphenol | 4-O-5', β-β' | 583 |
| 83 | 2-[2,6-dimethoxy-4-[1-[2-methoxy-4-propylphenoxy]propyl]phenoxy]-6-methoxy-4-propylphenol | 4-O-5', α-O-4' | 525 |
| 84 | 2,6-dimethoxy-4-[7-methoxy-5-propyl-2,3-dihydro-1-benzofuran-2-yl]phenoxy-2-yl]phenoxy]propyl]phenol | β-5', α-O-4' | 523 |
| 85 | 4-[1-[4-[1-(4-hydroxy-3-methoxyphenyl)propan-2-yl]-3-methoxyphenoxy]propyl]-2,6-dimethoxyphenol | β-1', α-O-4' | 483 |

Figure 6

Trimers

| # | Compound Name (IUPAC preferred) | Linkages | MW (Da) |
|---|---|---|---|
| 86 | 1-{1-phenylpropan-2-yl}-3-(2-phenylpropyl)benzene | β-1', β-5' | 314 |
| 87 | 4-(2-{3-[2-(4-hydroxyphenyl)propyl]phenyl}propyl)phenol | β-1', β-5' | 346 |
| 88 | 1-{1-phenylpropan-2-yl}-3-(4-propylphenoxy)benzene | 4-O-5', β-1' | 330 |
| 89 | 4-[1-(4-hydroxyphenyl)propan-2-yl]-2-(4-propylphenoxy)phenol | 4-O-5', β-1' | 362 |
| 90 | 1-{4-propylphenoxy}-3-[2-(3-propylphenyl)propyl]benzene | 4-O-5', β-5' | 373 |
| 91 | 2-(4-propylphenoxy)-4-[2-(3-propylphenyl)propyl]phenol | 4-O-5', β-5' | 388 |
| 92 | 1-[4-(2-phenylpropyl)phenoxy]-3-propylbenzene | 4-O-5', β-1' | 330 |
| 93 | 2-{4-[2-(4-hydroxyphenyl)propyl]phenoxy}-4-propylphenol | 4-O-5', β-1' | 362 |
| 94 | 3-(2-phenylpropyl)-3'-propyl-1,1'-biphenyl | 5-5', β-1' | 314 |
| 95 | 5-[2-(4-hydroxyphenyl)propyl]-5'-propyl-[1,1'-biphenyl]-2,2'-diol | 5-5', β-1' | 362 |
| 96 | 1-(1-phenylpropan-2-yl)-4-(3-propylphenoxy)benzene | 4-O-5', β-1' | 330 |
| 97 | 2-{4-[1-(4-hydroxyphenyl)propan-2-yl]phenoxy}-4-propylphenol | 4-O-5', β-1' | 362 |
| 98 | 4-propyl-1-{3-propylphenoxy}-2-(4-propylphenoxy)benzene | 4-O-5', 4-O-5' | 389 |
| 99 | 4-propyl-2-[4-propyl-2-(4-propylphenoxy)phenoxy]phenol | 4-O-5', 4-O-5' | 405 |
| 100 | 1-(2,3-dimethyl-4-phenylbutyl)-3-(4-propylphenoxy)benzene | 4-O-5', β-β' | 373 |
| 101 | 4-[4-(4-hydroxyphenyl)-2,3-dimethylbutyl]-2-(4-propylphenoxy)phenol | 4-O-5', β-β' | 405 |
| 102 | 1-propyl-3-{4-[2-(3-propylphenyl)propyl]phenoxy}benzene | 4-O-5', β-5' | 373 |
| 103 | 4-propyl-2-(4-{2-[3-propylphenyl)propyl]phenoxy}phenol | 4-O-5', β-5' | 389 |
| 104 | 3-(2,3-dimethyl-4-phenylbutyl)-3'-propyl-1,1'-biphenyl | 5-5', β-β' | 357 |
| 105 | 5-[4-(4-hydroxyphenyl)-2,3-dimethylbutyl]-5'-propyl-[1,1'-biphenyl]-2,2'-diol | 5-5', β-β' | 405 |
| 106 | 3-propyl-3'-[2-(3-propylphenyl)propyl]-1,1'-biphenyl | 5-5', β-5' | 357 |
| 107 | 5-propyl-5'-[2-(3-propylphenyl)propyl]-[1,1'-biphenyl]-2,2'-diol | 5-5', β-5' | 388 |
| 108 | 1-{2,3-dimethyl-4-phenylbutyl}phenoxy]-3-propylbenzene | 4-O-5', β-β' | 373 |
| 109 | 2-{4-[4-(4-hydroxyphenyl)-2,3-dimethylbutyl]phenoxy}-4-propylphenol | 4-O-5', β-β' | 405 |
| 110 | 3-(4-hydroxyphenyl)propan-2-yl)-3'-propyl-1,1'-biphenyl | 5-5', β-1' | 314 |
| 111 | 5-[(4-hydroxyphenyl)propan-2-yl]-5'-propyl-[1,1'-biphenyl]-2,2'-diol | 5-5', β-1' | 362 |
| 112 | 1-(1-phenylpropyl)-3-{2-(3-propylphenyl)propyl]benzene | β-5', β-5' | 357 |
| 113 | 4-(2-{3-[2-(3-propylphenyl)propyl]phenyl}propyl)phenol | β-5', β-5' | 373 |

Figure 7

Tetramers

| # | Compound Name (IUPAC preferred) | Linkages | MW (Da) |
|---|---|---|---|
| 114 | 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol | 5-5', β-1', 4-O-5' | 647 |
| 115 | 2'-{2-(2-hydroxy-3-methoxy-5-propylphenoxy)-3-methoxy-5-propylphenoxy}-3,3'-dimethoxy-5,5'-dipropyl-[1,1'-biphenyl]-2-ol | 4-O-5', 4-O-5', 5-5' | 658 |
| 116 | 5-{1-[3-(2,6-dimethoxy-4-propylphenoxy)-4-hydroxy-5-methoxyphenyl]propan-2-yl}-3,3'-dimethoxy-5'-propyl-[1,1'-biphenyl]-2,2'-diol | 5-5', β-1', 4-O-5' | 647 |
| 117 | 4-{1-(2,6-dimethoxy-4-{7-methoxy-5-[1-(2-methoxy-4-propylphenoxy)propyl]-3-methyl-2,3-dihydro-1-benzofuran-2-yl}phenoxy)propyl}-2-methoxyphenol | α-O-4', β-5', α-O-4' | 687 |
| 118 | 4-[4-{4-hydroxy-3-[4-(2-(4-hydroxy-3-methoxyphenyl)propyl)-2,6-dimethoxyphenoxy]-5-methoxyphenyl}-hexahydrofuro[3,4-c]furan-1-yl]-2,6-dimethoxyphenol | β-1', 4-O-5', β-β' | 705 |
| 119 | 5-{1-[4-hydroxy-3-methoxyphenyl]propan-2-yl}-3,3'-dimethoxy-5'-{1-(2-methoxy-4-propylphenoxy)propyl}-[1,1'-biphenyl]-2,2'-diol | α-O-4', 5-5', β-1' | 617 |
| 120 | 5-(2-{2',6-dihydroxy-3',5-dimethoxy-5'-propyl-[1,1'-biphenyl]-3-yl}propyl)-3,3'-dimethoxy-5'-propyl-[1,1'-biphenyl]-2,2'-diol | 5-5', β-1', 5-5' | 617 |
| 121 | 2-(2,6-dimethoxy-4-{7-methoxy-5-(7-methoxy-3-methyl-5-propyl-2,3-dihydro-1-benzofuran-2-yl)-3-methyl-2,3-dihydro-1-benzofuran-2-yl}phenoxy)-6-methoxy-4-propylphenol | β-5', β-5', 4-O-5' | 685 |
| 122 | 3,3'-dimethoxy-5-(7-methoxy-5-(7-methoxy-3-methyl-5-propyl-2,3-dihydro-1-benzofuran-2-yl)-3-methyl-2,3-dihydro-1-benzofuran-2-yl)-5'-propyl-[1,1'-biphenyl]-2,2'-diol | β-5', β-5', 5-5' | 655 |
| 123 | 4-[4-{4-(2-hydroxy-3-methoxy-5-propylphenoxy)-3-methoxyphenyl}-hexahydrofuro[3,4-c]furan-1-yl]-2-methoxy-6-(2-methoxy-4-propylphenoxy)phenol | 4-O-5', β-β', 4-O-5' | 687 |
| 124 | 5-{1-(2,6-dimethoxy-4-propylphenoxy)propyl}-5'-{1-(4-hydroxy-3-methoxyphenyl)propan-2-yl}-3,3'-dimethoxy-[1,1'-biphenyl]-2,2'-diol | α-O-4', 5-5', β-1' | 647 |
| 125 | 2-{4-[5-{1-(2,6-dimethoxy-4-propylphenoxy)propyl}-7-methoxy-3-methyl-2,3-dihydro-1-benzofuran-2-yl]-2,6-dimethoxyphenoxy}-6-methoxy-4-propylphenol | α-O-4', β-5', 4-O-5' | 717 |
| 126 | 4-[4-{1-[4-(2-hydroxy-3-methoxy-5-propylphenoxy)-3-methoxyphenyl]propoxy}-2-methoxyphenyl]-hexahydrofuro[3,4-c]furan-1-yl]-2,6-dimethoxyphenol | β-β', α-O-4', 4-O-5' | 717 |
| 127 | 2'-{2-hydroxy-5-{1-(4-hydroxy-3,5-dimethoxyphenyl)propan-2-yl}-2-methoxyphenoxy}-3,3'-dimethoxy-5,5'-dipropyl-[1,1'-biphenyl]-2-ol | β-1', 4-O-5', 5-5' | 647 |
| 128 | 2-(2,6-dimethoxy-4-propylphenoxy)-4-{2-[4-hydroxy-3-methoxy-5-(2-methoxy-4-propylphenoxy)phenyl]propyl}-6-methoxyphenol | 4-O-5', β-1', 4-O-5' | 647 |
| 129 | 4-{1-[4-{2,6-dimethoxy-4-(7-methoxy-3-methyl-5-propyl-2,3-dihydro-1-benzofuran-2-yl)phenoxy}propyl]-2,6-dimethoxyphenoxy}propyl}-2,6-dimethoxyphenol | β-5', α-O-4', α-O-4' | 747 |
| 130 | 3-propyl-3'-{1-[4-(3-propylphenoxy)phenyl]propan-2-yl}-1,1'-biphenyl | 5-5', β-1', 4-O-5' | 449 |
| 131 | 5-{1-[4-(2-hydroxy-5-propylphenoxy)phenyl]propan-2-yl}-5'-propyl-[1,1'-biphenyl]-2,2'-diol | 5-5', β-1', 4-O-5' | 497 |
| 132 | 3',5-dipropyl-2-{5-propyl-2-(3-propylphenoxy)phenoxy}-1,1'-biphenyl | 4-O-5', 4-O-5', 5-5' | 507 |
| 133 | 2'-{2-(2-hydroxy-5-propylphenoxy)-5-propylphenoxy}-5,5'-dipropyl-[1,1'-biphenyl]-2-ol | 4-O-5', 4-O-5', 5-5' | 539 |
| 134 | 3-propyl-3'-{1-[3-(4-propylphenoxy)phenyl]propan-2-yl}-1,1'-biphenyl | 5-5', β-1', 4-O-5' | 449 |
| 135 | 5-{1-[4-hydroxy-3-(4-propylphenoxy)phenyl]propan-2-yl}-5'-propyl-[1,1'-biphenyl]-2,2'-diol | 5-5', β-1', 4-O-5' | 497 |
| 136 | 1-(2,3-dimethyl-4-phenylbutyl)-3-[4-(2-phenylpropyl)phenoxy]benzene | β-1', 4-O-5', β-β' | 449 |
| 137 | 4-[4-(4-hydroxyphenyl)-2,3-dimethylbutyl]-2-{4-[2-(4-hydroxyphenyl)propyl]phenoxy}phenol | β-1', 4-O-5', β-β' | 497 |
| 138 | 3-propyl-3'-(2-{3'-propyl-[1,1'-biphenyl]-3-yl}propyl)-1,1'-biphenyl | 5-5', β-1', 5-5' | 433 |
| 139 | 5-(2-{2',6-dihydroxy-5'-propyl-[1,1'-biphenyl]-3-yl}propyl)-5'-propyl-[1,1'-biphenyl]-2,2'-diol | 5-5', β-1', 5-5' | 497 |
| 140 | 1-propyl-3-[4-(2-{3-[2-(3-propylphenyl)propyl]phenyl}propyl)phenoxy]benzene | β-5', β-5', 4-O-5' | 491 |
| 141 | 4-propyl-2-[4-(2-{3-[2-(3-propylphenyl)propyl]phenyl}propyl)phenoxy]phenol | β-5', β-5', 4-O-5' | 507 |
| 142 | 3-propyl-3'-(2-{3-[2-(3-propylphenyl)propyl]phenyl}propyl)-1,1'-biphenyl | β-5', β-5', 5-5' | 475 |
| 143 | 5-(2-{3-[2-(3-hydroxy-5-propylphenyl)propyl]phenyl}propyl)-5'-propyl-[1,1'-biphenyl]-2,2'-diol | β-5', β-5', 5-5' | 523 |
| 144 | 1-(4-{2,3-dimethyl-4-[3-(4-propylphenoxy)phenyl]butyl}phenoxy)-3-propylbenzene | 4-O-5', β-β', 4-O-5' | 507 |
| 145 | 2-(4-{4-[4-hydroxy-3-(4-propylphenoxy)phenyl]-2,3-dimethylbutyl}phenoxy)-4-propylphenol | 4-O-5', β-β', 4-O-5' | 539 |
| 146 | 2-[3-(1-phenylpropan-2-yl)phenoxy]-3',5-dipropyl-1,1'-biphenyl | β-1', 4-O-5', 5-5' | 449 |
| 147 | 2'-{2-hydroxy-5-{1-(4-hydroxyphenyl)propan-2-yl}phenoxy}-5,5'-dipropyl-[1,1'-biphenyl]-2-ol | β-1', 4-O-5', 5-5' | 497 |
| 148 | 1-propyl-4-(3-{2-[3-(4-propylphenoxy)phenyl]propyl}phenoxy)benzene | 4-O-5', β-1', 4-O-5' | 465 |
| 149 | 4-{2-[4-hydroxy-3-(4-propylphenoxy)phenyl]propyl}-2-(4-propylphenoxy)phenol | 4-O-5', β-1', 4-O-5' | 497 |

Figure 8

BIODERIVED HEAT TRANSFER FLUIDS AND METHODS OF MAKING THE SAME

CROSS-REFERENCE TO RELATED APPLICATIONS

This application claims priority from U.S. Provisional Patent Application No. 62/897,477 filed on Sep. 9, 2019, the contents of which are incorporated herein by reference in its entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a composition that includes a lignin-derived mixture that includes at least one of a dimer, a trimer, and/or a tetramer, where the composition is characterized by a thermal stability up to a maximum temperature between about 260° C. and about 300° C. In some embodiments of the present disclosure, the composition may have a heat capacity between about 0.5 kJ/kg·° C. and about 4.0 kJ/kg·° C. In some embodiments of the present disclosure, the composition may have a molecular weight between about 200 Da and about 750 Da. In some embodiments of the present disclosure, the composition may have a dynamic viscosity between greater than zero cP and about 15 cP.

In some embodiments of the present disclosure, the dimer may include at least one of 2-[2-(4-hydroxy-3,5-dimethoxy-phenyl)ethyl]-6-methoxy-4-propylphenol, 3,3'-dimethoxy-5,5'-di propyl-[1,1'-biphenyl]-2,2'-diol, and/or 2-(2,6-dimethoxy-4-propylphenoxy)-6-methoxy-4-propylphenol. In some embodiments of the present disclosure, the trimer may include at least one of 4-[4-(4-hydroxy-3,5-dimethoxyphenyl)-hexahydrofuro[3,4-c]furan-1-yl]-2-methoxy-6-(2-methoxy-4-propylphenoxy)phenol and/or 1-(2,3-dimethyl-4-phenylbutyl)-3-(4-propylphenoxy)benzene. In some embodiments of the present disclosure, the tetramer may include at least one of 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol and/or 3-propyl-3'-{1-[4-(3-propylphenoxy)phenyl]propan-2-yl}-1,1'-biphenyl.

An aspect of the present disclosure is a method that includes contacting a first oil with a solvent to create a mixture that includes a light phase and a heavy phase, where the solvent includes an oxygen-containing hydrocarbon, the first oil includes a lignin-derived compound including at least one of a dimer, a trimer, and/or a tetramer, and the contacting transfers at least a portion of the lignin-derived compound from the first oil to the light phase. In some embodiments of the present disclosure, the solvent may include at least one of an ether and/or a ketone. In some embodiments of the present disclosure, the solvent may be ethyl tert-butyl ether (ETBE).

In some embodiments of the present disclosure, the lignin-derived compound may include a linkage type of at least one of bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') or heterocyclic-ring-opened β-β' derivatives, and/or biphenyl (5-5'). In some embodiments of the present disclosure, the contacting may include performing the contacting at a first temperature between −50° C. and 230° C. In some embodiments of the present disclosure, the contacting may include evaporating at least a portion of the solvent to form a vapor, condensing at least a portion of the vapor to form a condensate, and returning the condensate to the mixture.

In some embodiments of the present disclosure, during the contacting, the first oil and solvent may be present at a ratio between 1 g of first oil to 1 ml of solvent and 1 g of first oil to 100 ml of solvent. In some embodiments of the present disclosure, the method may further include drying the light phase resulting in the forming of a vapor phase and a second oil comprising the lignin-derived compound. In some embodiments of the present disclosure, the method may further include distilling the second oil resulting in the forming of a lower molecular weight (MW) stream that includes the lignin-derived compound and a higher MW stream.

In some embodiments of the present disclosure, the distilling may be performed in a distillation column having multiple stages positioned between a bottom and an overhead, where the higher MW stream exits the distillation column at the bottom, and the lower MW stream exits the distillation column at the overhead. In some embodiments of the present disclosure, the bottom may be maintained at a second temperature between 20° C. and 300° C. In some embodiments of the present disclosure, the overhead may be maintained at a third temperature that is less than the second temperature. In some embodiments of the present disclosure, the overhead may be maintained at a pressure between 5 mTorr and 30 mTorr.

BRIEF DESCRIPTION OF DRAWINGS

Some embodiments are illustrated in referenced figures of the drawings. It is intended that the embodiments and figures disclosed herein are to be considered illustrative rather than limiting.

FIGS. 4-8 illustrate lists of lignin-derived dimers, trimers, and tetramers suitable for use as heat transfer fluids, according to some embodiments of the present disclosure.

Figure 1:
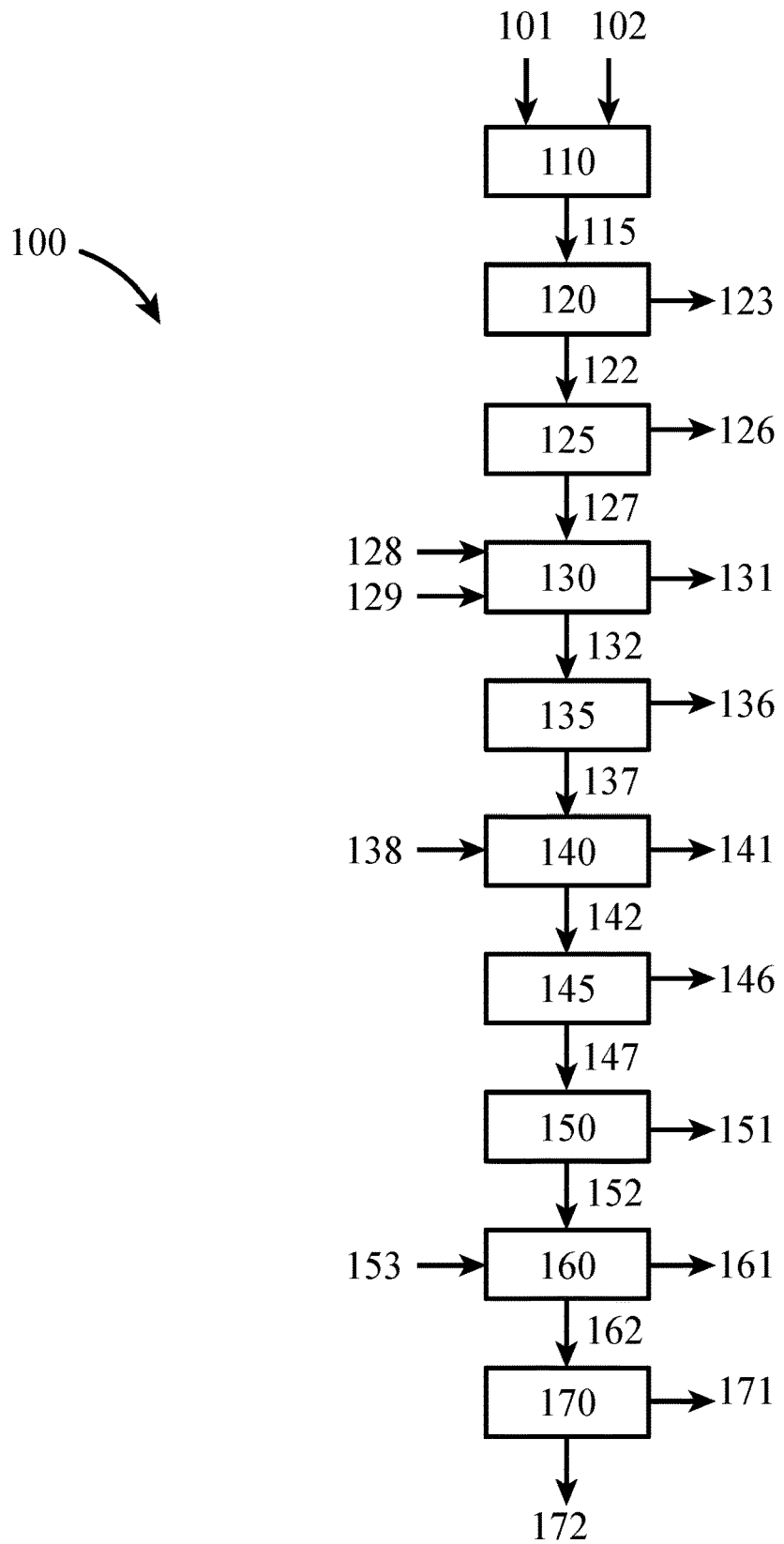
FIG. 1 illustrates a system for producing lignin-derived heat transfer fluids, according to some embodiments of the present disclosure.

REFERENCE NUMBERS 100 system
101 biomass
102 other materials
110 reactor
115 suspension
120 filter
122 liquor
123 solid
125 first dryer
126 first vapor
127 first oil
128 water
129 first solvent
130 first extraction unit
131 first heavy phase
132 first light phase 135 second dryer
136 second vapor
137 second oil
138 second solvent
140 second extraction unit
141 second heavy phase
142 second light phase
145 third dryer
146 third vapor
147 third oil
150 distillation unit
151 lower molecular weight stream
152 higher molecular weight stream
153 third solvent
160 third extraction unit
161 third heavy phase
162 third light phase
170 fourth dryer
171 fourth vapor
172 product

DETAILED DESCRIPTION

The present disclosure may address one or more of the problems and deficiencies of the prior art. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to bioderived heat transfer fluids (HTFs) and methods and systems for making such HTFs. Lignin-derived dimer and oligomer compounds and their resulting mixtures from lignin depolymerization processes may possess thermophysical properties similar to commercial heat transfer fluids. In some embodiments of the present disclosure, dimer and/or oligomer (e.g., trimer and/or tetramers) mixtures produced directly from lignin depolymerization processes may provide compounds and/or compositions suitable for use as HTFs. These mixtures may possess superior thermophysical properties compared to commercially available, incumbent heat transfer fluids derived from petroleum, such as higher thermal stability and/or lower vapor pressures. Among other industrial uses, these enhanced properties may mitigate the need for expensive heat exchange networks and thermal reservoirs integrated into current parabolic trough concentrating solar power (CSP) plants. In some embodiments of the present disclosure, dimer and oligomer mixtures that have been additionally modified via known upgrading unit operations (e.g. catalytic hydrodeoxygenation (HDO)) may provide compounds and/or compositions suitable for use as HTFs. Such upgrading steps of lignin dimers and oligomers may enhance desirable HTF characteristics, such as lowered viscosity and lowered freezing point, compared to dimers and oligomers having higher oxygen contents that are directly produced from lignin depolymerization.

FIG. 1 illustrates a system 100 for producing bioderived HTFs, according to some embodiments of the present disclosure. In this example, a system 100 may begin with the directing of biomass 101 and/or other materials 102 to a reactor 110, for example a reactor for completing reductive catalytic fractionation (RCF) of the biomass. The biomass 101 may contain at least one of lignin, cellulose, and/or hemicellulose such that when combined with the other materials 102, at least the lignin may be depolymerized from relatively high molecular weight (MW) compounds to smaller molecular weight compounds typically ranging from 100 Da to 3000 Da. Smaller molecular weight monomeric compounds may include at least one of phenol, a methoxy phenol, an alkyl methoxyphenol, and/or an alkanol methoxyphenol as monomers. Product mixtures from reactor 110 may further include dimeric, trimeric, and/or tetrameric lignin-derived compounds composed of monomeric units that are bonded by various inter-aromatic carbon-oxygen and/or carbon-carbon linkages, such as bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') and/or heterocyclic-ring-opened β-β' derivatives, and/or biphenyl (5-5') linkage types. Dimeric, trimeric, and tetrameric compounds containing these inter-aromatic linkages may possess lower molecular weights (e.g. 150 Da to 1200 Da) than other lignin depolymerization compounds, as well as low melting points, high boiling points, varying oxygen content (depending on the severity of RCF treatment), and high thermal and chemical stabilities.

Examples of biomass 101 suitable for embodiments described herein include forest materials (e.g. wood), herbaceous materials (e.g. grasses), flowering plants and/or shrubs, agricultural materials (e.g. bagasse, corn stover, wheat straw, nut shells and hulls, etc.), residential waste (e.g. clippings), and/or any other suitable material containing a sufficient amount of lignin. Other materials 102 for depolymerizing the lignin contained in the biomass 101 may include at least one of a solvent, a catalyst, and/or a hydrogen source. For example, lignin may be depolymerized in a reactor 110 by combining poplar sawdust with a carbon-supported nickel catalyst in a solvent and with hydrogen gas present at about 30 bar pressure, resulting in a suspension 115 containing the lignin depolymerization products such as those families listed above, including dimers and oligomers containing bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') and/or heterocyclic-ring-opened β-β' derivatives, and/or biphenyl (5'5') linkage types. Examples of suitable solvents for completing the lignin depolymerization in a reactor 110 include methanol, ethanol, propanols, butanols, alkyl glycols, alkoxy glycols, and/or mixtures of each of these with water. Examples of other catalysts suitable for depolymerizing lignin include carbon- and/or metal oxide-supported platinum group metals, RANEY Ni, and/or commercial hydrogenation catalysts. In some embodiments of the present disclosure, a reactor 110 may be operated at a temperature between about 150° C. and about 300° C., at a pressure between about 1 bar and about 100 bar, and a suspension 115 may be maintained in the reactor 110 for a period of time between about 5 minutes and about 24 hours. In some embodiments of the present disclosure, a suspension 115 may be cooled in the reactor 110 and/or cooled using a heat exchanger (not shown) downstream of the reactor. In some embodiments of the present disclosure, the reactor 110 may be a batch stirred tank reactor and/or a continuous stirred tank reactor and/or a continuous tubular reactor. Agitation may be provided by any suitable means.

After depolymerization in the reactor 110 has proceeded to a completion point, the resultant suspension 115 may be directed to a filter 120, which may separate the suspension 115 into a stream containing a solid 123 and a liquor 122, where the liquor 122 may contain at least a portion of the lower molecular weight compounds including dimers and oligomers containing bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') and/or heterocyclic-ring-opened β-β' derivatives, and/or biphenyl (5-5') linkage types. In some embodiments of the present disclosure, the filtration of the suspension 115 may be completed using a bag filter, a cartridge filter, a filtering basket centrifuge, and/or any other suitable filter. Filtration may be achieved by pumping the suspension 115 through the filter 120 and/or by pulling a vacuum on the downstream side of the filter 120. In some embodiments of the present disclosure, a centrifuge may be used instead of, or in addition to, a filter to separate the suspension 115 into the liquor 122 and the solid 123. In some embodiments of the present disclosure, the solid 123 may be contacted with a solvent (not shown) to increase the amount of targeted lower molecular weight compounds (e.g. dimers, trimers, tetramers) recovered from the suspension 115. This "washing" of the solid 123 may be completed while the solid 123 is contained in the filter and/or centrifuge, or after the solid 123 has been removed from the filter and/or centrifuge. The solvent resulting from the washing, containing the low molecular weight compounds, may then be combined with the liquor 122. In some embodiments of the present disclosure, the solvent used to wash the solid 123 may be the same as the solvent used in the reactor 110.

Referring again to FIG. 1, the liquor 122 may be subsequently dried in a first dryer 125 to produce a first vapor 126 (e.g. of the solvents used in the upstream unit operations and potentially other volatiles such as light alkanes, CO, and/or $CO_2$) and a first oil 127 containing the higher molecular weight compounds. In some embodiments of the present disclosure, the first dryer 125 may be operated at a pressure below one atmosphere of pressure and at a temperature between about 25° C. and about 100° C. In some embodiments of the present disclosure, the first dryer 125 may be a rotary dryer and/or an evaporator, such as a falling-film evaporator or an agitated thin film evaporator, and/or a flash vessel.

The first oil 127 may then be directed to a first extraction unit 130 where it is combined with water 128 and a first solvent 129 to create a mixture of these streams. This mixture may then phase separate (i.e. gravimetrically separate) into a first light phase 132 containing at least a portion of the targeted lower molecular weight compounds (e.g. dimers, trimers, and/or tetramers) and a first heavy phase 131, where the first light phase 132 separates into a top layer positioned on a lower layer of the first heavy phase 131. The first light phase 132 may include most of the first solvent 129 and at least a portion of the lignin compounds, whereas the first heavy phase 131 may include most of the water 128 and at least a portion of the non-lignin compounds (e.g. carbohydrates and/or carbohydrate-derived compounds). In some embodiments, the first extraction unit 130 may include one or more stages in series for repeatedly contacting the first oil 127 with additional charges of fresh water and/or to repeatedly contact the first light phase 132 with the first heavy phase 131, to maximize the amount of lignin compounds removed from the non-lignin compounds. In some embodiments of the present disclosure, the first extraction unit 130 may contain between 1 and 10 extraction stages. In some embodiments of the present disclosure, the contacting of the first oil 127 with water 128 and a first solvent 129 may include agitation. The first extraction unit 130 may be a continuous liquid-liquid extraction column and/or a batch stirred tank. The first extraction unit 130 may be operated at a temperature between about 25° C. and about 100° C. and with the first light phase 132 having a residence time in the first extraction unit 130 between about one minute and about 24 hours. In some embodiments of the present disclosure, the first solvent 129 may include at least one oxygenated hydrocarbon solvent, for example, an alkyl ester compound. In some embodiments of the present disclosure, the first solvent 129 may include at least one of methyl acetate, ethyl formate, ethyl acetate, n-propyl acetate, isopropyl acetate, propylene glycol methyl ether acetate, n-butyl acetate, isobutyl acetate, ethyl propionate, ethyl benzoate, and/or isopropyl butyrate.

Referring again to FIG. 1, the first light phase 132 containing the lignin compounds may be subsequently dried in a second dryer 135 to produce a second vapor 136 (e.g. of the solvents used in the upstream unit operations) and a second oil 137 containing the lignin compounds. In some embodiments of the present disclosure, the second dryer 135 may be operated at a pressure below one atmosphere of pressure and at a temperature between about 25° C. and about 100° C. In some embodiments of the present disclosure, the second dryer 135 may be a rotary dryer and/or an evaporator, such as a falling-film evaporator, an agitated thin film evaporator, and/or a flash vessel.

As shown in the example of FIG. 1, the system 100 may continue with the directing of the second oil 137 to a second extraction unit 140 in which the second oil 137 is contacted with a second solvent 138, resulting in the forming of a mixture that can separate into a second light phase 142 and a second heavy phase 141. In some embodiments of the present disclosure, the second light phase 142 may include the second solvent 138 containing at least a portion of the targeted lower molecular weight compounds (e.g. dimers, trimers, and/or tetramers), whereas the second heavy phase 141 may include higher molecular weight compounds. In some embodiments of the present disclosure, the second solvent 138 may include an oxygen-containing hydrocarbon of moderate polarity and low viscosity, with a boiling point in the range of −25° C. to 200° C. In some embodiments of the present disclosure, the second solvent 138 may have a boiling point in the range of 25° C. to 100° C. In some embodiments of the present disclosure, the second solvent 138 may include at least one of methyl ether, ethyl ether, n-propyl ether, isopropyl ether, n-butyl ether, isobutyl ether, methyl n-butyl ether (MNBE), methyl tert-butyl ether (MTBE), methyl tert-amyl ether (MTAE), ethyl n-butyl ether (ENBE), ethyl tert-butyl ether (ETBE), ethyl tert-amyl ether (ETAE), n-propyl tert-butyl ether (NPTBE), isopropyl tert-butyl ether (IPTBE), di-tert-butyl ether (DTBE), diethylene glycol methyl ether, diethylene glycol ethyl ether, triethylene glycol methyl ether, ethylene glycol n-propyl ether, ethylene glycol n-butyl ether, ethylene glycol hexyl ether, ethylene glycol phenyl ether, propylene glycol methyl ether, dipropylene glycol methyl ether, propylene glycol n-propyl ether, dipropylene glycol n-butyl ether, propylene glycol phenyl ether, methyl ethyl ketone, diethyl ketone, methyl n-propyl ketone, methyl isobutyl ketone, and/or diisobutyl ketone.

In some embodiments of the present disclosure, the second extraction unit 140 may include one or more stages in series for repeatedly contacting the second oil 137 with additional charges of the second solvent 138 and/or to repeatedly contact the second light phase 142 with the second heavy phase 141, to maximize the amount of targeted lower molecular weight compounds (e.g. dimers, trimers, and/or tetramers) removed from the higher molecular weight compounds. In some embodiments of the present disclosure, the second extraction unit 140 may contain between 1 and 10 extraction stages. In some embodiments of the present disclosure the contacting of the second oil 137 with the second solvent 138 may include agitation. The second extraction unit 140 may be a continuous liquid-liquid extraction column and/or batchwise in a stirred tank. In some embodiments of the present disclosure, the second extraction unit 140 may be configured to bring the mixture of the second oil 137 and the second solvent 138, the second light phase 142, and/or the second heavy phase 141 to a temperature between −50° C. and 230° C. This may be achieved using a heat exchanger (not shown). The second extraction unit 140 may be operated at a gauge pressure between 0 atmospheres (i.e. full vacuum) and about 9 atmospheres. In some embodiments of the present disclosure, at least a portion of the mixture contained within the second extraction unit 140 may be vaporized, where the vapor is subsequently condensed and returned to the mixture.

Referring again to FIG. 1, a system 100 may continue with directing the second light phase 142 containing the targeted lower molecular weight lignin-derived compounds (e.g. dimers, trimers, and/or tetramers) to a third dryer 145. The second light phase 142 containing the targeted lower molecular weight compounds may be subsequently dried in a third dryer 145 to produce a third vapor 146 (e.g. of the solvents used in the upstream unit operations) and a third oil 147 containing the targeted lower molecular weight compounds, for example, monomeric, dimeric, trimeric, and tetrameric lignin-derived compounds. In some embodiments of the present disclosure, a third dryer 145 may be operated at a pressure below one atmosphere of pressure and at a temperature between about 25° C. and about 100° C. In some embodiments of the present disclosure, the third dryer 145 may be a rotary dryer and/or an evaporator (e.g. a falling-film evaporator and/an agitated thin film evaporator), and/or a flash drum.

The third oil 147 may then be directed to a distillation unit 150 configured to separate the third oil 147 into a lower molecular weight stream 151 containing, for example, monomeric lignin-derived compounds, and a targeted higher molecular weight stream 152 containing, for example, dimeric, trimeric, and/or tetrameric lignin-derived compounds. In some embodiments of the present disclosure, a distillation unit 150 may include a reboiler and a condenser (not shown) with between 1 and 60 theoretical stages positioned between the reboiler and the condenser. In some embodiments of the present disclosure, the distillation column may be operated in either continuous or batch mode. In some embodiments of the present disclosure, the reboiler may operate at a temperature between about 20° C. and about 300° C. In some embodiments of the present disclosure, the temperature difference between the reboiler and the condenser ($T_{reb}-T_{con}$) may be between about 50° C. and about 100° C., where $T_{reb}$ is the temperature of the boiling liquid in the reboiler and $T_{con}$ is the temperature of the vapor condensing in the condenser. In some embodiments of the present disclosure, the reboiler may operate at a pressure between greater than zero atmospheres absolute pressure (i.e. absolute vacuum) and about 10 atmospheres of absolute pressure. In some embodiments of the present disclosure, the pressure difference between the reboiler and the condenser ($P_{reb}-P_{con}$) may be between greater than zero atmospheres and about one atmosphere. In some embodiments of the present disclosure, the reflux ratio (i.e., the ratio of condenser effluent returned to the column versus that removed for collection) may be between about 0.10 and about 80.

Referring again to FIG. 1, the system 100 may include directing the higher molecular weight stream 152 containing the targeted molecules (e.g. dimers, trimers, and/or tetramers) to a third extraction unit 160 where the higher molecular weight stream 152 may be combined with a third solvent 153 to create a mixture of the higher molecular weight stream 152 and the third solvent 153. This mixture may then separate into a third light phase 162 that includes the lower molecular weight compounds (e.g. dimeric, trimeric, and/or tetrameric lignin-derived compounds containing various carbon-carbon and/or carbon-oxygen linkages listed above, with low melting points, high boiling points, and high thermal and chemical stabilities) and a third heavy phase 161 that includes heavier molecular weight compounds (e.g. higher-order oligomeric (i.e., pentameric or greater) lignin-derived compounds). In some embodiments of the present disclosure, the third solvent 153 may include a non-polar hydrocarbon. In some embodiments of the present disclosure, the third solvent 153 may include n-pentane, cyclopentane, n-hexane, 2-methylpentane, cyclohexane, n-heptane, 2-methylhexane, 2,2-dimethylpentane, cycloheptane, n-octane, 2,2,4-trimethylpentane, cyclooctane, n-nonane, cyclononane, n-decane, cyclodecane, and/or decalin.

In some embodiments of the present disclosure, the third extraction unit 160 may include one or more stages in series for repeatedly contacting the lower MW stream 152 with one or more charges of the third solvent 153 and/or to repeatedly contact the third light phase 162 with the third heavy phase 161, to maximize the amount of targeted lower molecular weight compounds (e.g. dimers, trimers, and/or tetramers) removed from the higher molecular weight compounds. In some embodiments of the present disclosure, the third extraction unit 160 may contain between 1 and 10 extraction stages. In some embodiments of the present disclosure, the contacting of the lower MW stream 151 with the third solvent 153 may include agitation. The third extraction unit 160 may be a continuous liquid-liquid extraction column and/or batchwise in a stirred tank. In some embodiments of the present disclosure, the third extraction unit 160 may be configured to bring the mixture of the lower MW stream 151 and the third solvent 153, the third light phase 162, and/or the third heavy phase 161 to a temperature between about −50° C. and about 150° C. This may be achieved using a heat exchanger (not shown). The third extraction unit 160 may be operated at a gauge pressure between 0 atmospheres and about 16 atmospheres. In some embodiments of the present disclosure, at least a portion of the mixture contained within the third extraction unit 150 may be vaporized, where the vapor is subsequently condensed and returned to the third extraction unit 150.

In some embodiments of the present disclosure, the system 100 may continue with directing the third light phase 162 to a fourth dryer 170. The third light phase 162 containing the targeted lower molecular weight compounds (e.g. dimers, trimers, and/or tetramers) may be dried in the fourth dryer 170 to produce a fourth vapor 171 (e.g. of the solvents used in the upstream unit operations) and the target product 172 containing the lower molecular weight compounds, for example, dimeric, trimeric, and/or tetrameric lignin-derived compounds, to be used as a HTF. In some embodiments of the present disclosure, the fourth dryer 170 may be operated at a pressure below one atmosphere of pressure and at a temperature between about 25° C. and about 100° C. In some embodiments of the present disclosure, the fourth dryer 170 may be a rotary dryer and/or an evaporator (e.g. a falling-film evaporator and/or an agitated thin film evaporator), and/or a flash drum.

In some embodiments of the present disclosure, the final product 172 may contain dimeric, trimeric, and/or tetrameric lignin-derived compounds containing bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') and/or heterocyclic-ring-opened β-β' derivatives, and/or biphenyl (5-5') linkage types. In some embodiments of the present disclosure, the final product 172 may possess at least one of a low melting point (between about −20° C. and about 80° C. at 1 atmosphere pressure), a high boiling point (between about 300° C. and about 450° C. at 1 atmosphere pressure), a high heat capacity (between about 0.5 kJ/(kg·° C.) and about 4.0 kJ/(kg·° C.) or between about 1.0 kJ/(kg·° C.) and about 2.0 kJ/(kg·° C.)), a moderate dynamic viscosity $\mu$ ($\mu$<15 cP), and a high thermal stability (degradation temperature $T_{degr}$ up to about 400° C. or up to about 280° C.). In some embodiments of the present disclosure, the final product 172 may possess color in the visible light spectrum ranging from brown to red to yellow to transparent hues.

Results:

Note: Reference numbers correspond to FIG. 1. Reductive catalytic fractionation was performed in a reactor 110 (300 mL batch reactor) at a temperature of about 225° C. using hybrid poplar sawdust (15.0 g, i.e. biomass 101), 15 wt % Ni/C catalyst (1.0 g), methanol solvent (150 mL), and hydrogen (30 bar $H_2$ charged at ambient conditions) for a total residence time of about 6 hours.

Following reaction, the reactor 110 was cooled to ambient temperature and vented to the atmosphere. The resulting suspension 115 was vacuum-filtered and washed with fresh methanol (200 mL) in a filter 120, after which the liquor 122 was directed to a first dryer 125 where it was rotary-evaporated to dryness under 70 mbar vacuum gauge pressure in a 35° C. water bath, yielding a viscous brown oil (i.e. first oil 127).

The resulting dried first oil 127 was directed to a first extraction unit 130, wherein it was subjected to liquid-liquid extraction inside of a separatory funnel using a 1:1 (v/v) mixture of purified water 128 and a first solvent 129 of ethyl acetate (30 mL of each solvent charged per gram of dry, filtered first oil 127). The ethyl acetate phase (i.e. the first light phase 132) was extracted three-fold, with fresh charges of 30 mL water added and decanted each round. The final ethyl acetate phase (i.e. first light phase 132) was decanted and directed to a second dryer 135 where the solvent was removed (i.e. second vapor 136) via rotary evaporation at 70 mbar vacuum gauge pressure in a 35° C. water bath to yield a viscous brown oil (i.e. second oil 137).

The resulting lignin-rich second oil 137 was subsequently directed to a second extraction unit 140 where it was suspended in ethyl ETBE (b.p. 71° C.) at a ratio of 10 mL fresh ETBE per 1.0 g of dry lignin-rich second oil 137. The resultant mixture was brought to a temperature of about 40° C. and allowed to equilibrate under magnetic stirring for about 30 minutes. After equilibration, the mixture was decanted. The ETBE extract, i.e. second light phase 142, was collected in a separate flask, while the raffinate, i.e. second heavy phase 141, was subjected to two additional rounds of extraction with fresh ETBE at the same conditions. After three total rounds, the combined ETBE phases, i.e. second light phase, was directed to a third dryer 145 where it was rotary evaporated to dryness at 70 mbar vacuum gauge pressure in a 35° C. water bath to yield a light brown third oil 147 having a qualitatively lower viscosity than the second oil 137. This third oil 147 was a mixture of monomeric, dimeric, trimeric, and tetrameric lignin products.

Next, the third oil 147 was directed to a distillation unit 150 where spinning band distillation was performed on the third oil 147. About eight grams of the third oil 147 was distilled in batch-mode over alumina chips under a dynamic vacuum of about 10 mTorr vacuum maintained by a continually operating vacuum pump. Distillate cuts comprised of monomeric lignin components were removed within vapor temperature ranges of 105° C.-175° C., 160° C.-195° C., and 150° C.-220° C., while the bottoms flask experienced heating under vacuum from about 20° C. to about 260° C. over a period of time between 3 hours and 4 hours. The bottoms phase was recovered as a brown viscous oil, i.e. the higher molecular weight stream 152.

Finally, the higher molecular weight stream 152 was directed to a third extraction unit 160, where a three-fold n-hexane (b.p. 68° C.) extraction was performed on higher molecular weight stream 152. 10 mL fresh n-hexane was used to extract each 1.0 g of distillation bottoms at 68° C. (reflux) with an equilibration times of 30 minutes per round. Three rounds were performed, with decanting of the n-hexane phase (i.e. third light phase 162) and addition of fresh solvent occurring between rounds. The final product 172, a mixture of dimeric, trimeric, and/or tetrameric lignin compounds and trace monomeric compounds, was produced by directing the third light phase 162 to a fourth dryer 170 where rotary evaporation was performed on the third light phase 162 at 70 mbar in a 35° C. water bath.

Figure 2:
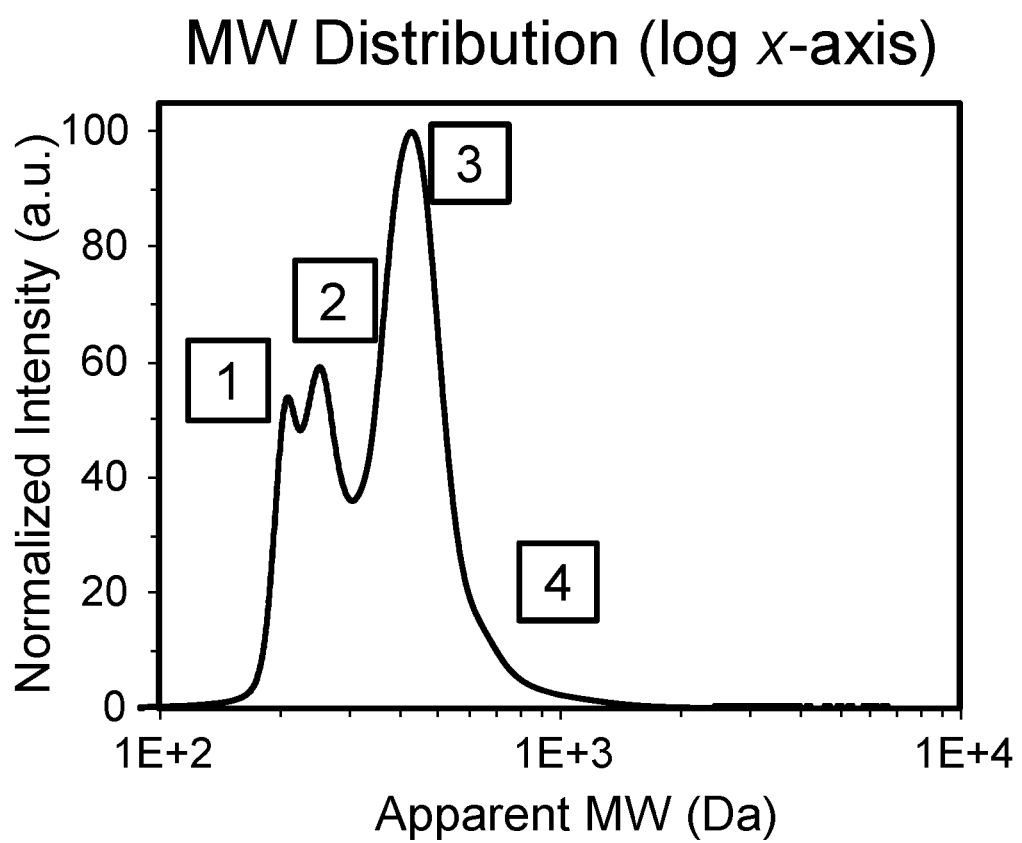
FIGS. 2 and 3 illustrate gel permeation chromatography (GPC) results of lignin-derived heat transfer fluids, according to some embodiments of the present disclosure.
Figure 3:
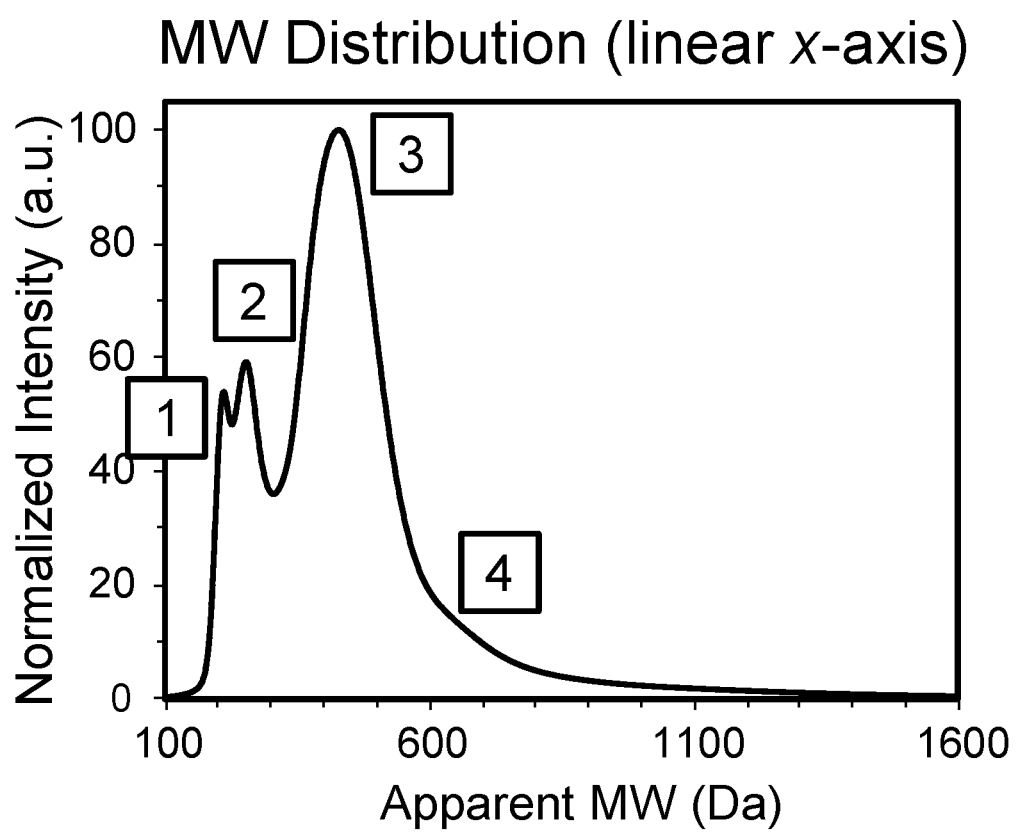

The resultant product 172 was characterized using gel permeation chromatography (GPC), thermogravimetric analysis (TGA), and differential scanning calorimetry (DSC) to determine apparent molecular weight ranges and certain thermal properties. Some of these results are summarized in FIGS. 2 and 3. The GPC traces illustrated in FIGS. 2 and 3 show at least four characteristic peaks or tails. The first characteristic peak, labeled 1, shows evidence of trace monomeric lignin compounds of MW<215 Da (e.g. dihydroxysinapyl alcohol a.k.a. 3-(4-hydroxy-3,5-dimethoxyphenyl)-1-propanol (212 Da)). The second characteristic peak, labeled 2, corresponds to molecules having molecular weights in the range between about 220 Da and about 420 Da, e.g. lignin-derived dimers. The third characteristic peak, labeled 3, corresponds to molecules having molecular weights in the range between about 420 Da and about 590 Da, e.g. lignin-derived trimers. A characteristic tail, labeled 4, corresponds to molecules having molecular weights in the range between about 590 Da and about 750 Da, e.g. lignin-derived tetramers. Higher molecular weight molecules, e.g. greater than about 750 Da, are not evident in the GPC traces as these have been removed by the steps described above.

Computational tools were used to identify molecules having molecular weights in ranges corresponding to dimers, trimers, and/or tetramers. Specifically, a hypothetical birch lignin polymer was considered as a representative hardwood lignin structure using previously published lignin libraries (L. D. Dellon et al. *Energy & Fuels* 8263, 2017). Then, a separate computational tool, LigninBuilder (J. V. Vermaas et al. *ACS Sustainable Chemistry & Engineering* 3443, 2019), was utilized to simulate the cleavage of all β-O-4' linkages known to occur during RCF treatments. The outcome of this simulation exercise was an extensive list of hypothetical hardwood lignin dimers, trimers, tetramers, and higher-order compounds that remain following β-O-4' cleavage. The resulting dimer, trimer, and tetramer structures were then further modified to incorporate additional known reduction chemistries, such as hydrogenolysis, hydrogenation, dehydroxylation, hydrodeoxygenation, and/or ring-opening of inter-aromatic moieties and side chains, which are all reactions that occur during RCF treatments. Lastly, certain β-O-4' compounds were additionally included in the overall list, since they have been detected in experimental samples via high-resolution HPLC-MS. The lignin-derived dimers, trimers, and tetramers resulting from this analysis are listed below.

Examples of lignin-derived dimers that may fall within the characteristic GPC peak 2 shown in FIGS. 2 and 3, according to some embodiments of the present disclosure, include 4-[(1E)-2-(4-hydroxy-3-methoxyphenyl)ethenyl]-2,6-dimethoxyphenol, 4-[2-(4-hydroxy-3-methoxyphenyl)ethyl]-2,6-dimethoxyphenol, 4-[2-(4-hydroxy-3,5-dimethoxyphenyl)ethyl]-2,6-dimethoxyphenol, 4-[3-hydroxy-2-(4-hydroxy-3,5-dimethoxyphenyl)propyl]-2,6-dimethoxyphenol, 2,6-dimethoxy-4-{7-methoxy-5-[(1E)-prop-1-en-1-yl]-2,3-dihydro-1-benzofuran-2-yl}phenol, 2-[1-hydroxy-3-(4-hydroxy-3-methoxyphenyl)propan-2-yl]-6-methoxy-4-[(1E)-prop-1-en-1-yl]phenol, 2,6-dimethoxy-4-(7-methoxy-5-propyl-2,3-dihydro-1-benzofuran-2-yl)phenol, 2-[2-(4-hydroxy-3,5-dimethoxyphenyl)ethyl]-6-methoxy-4-propylphenol, 2-[1-hydroxy-3-(4-hydroxy-3-methoxyphenyl)propan-2-yl]-6-methoxy-4-propylphenol, 2,6-dimethoxy-4-(7-methoxy-3-methyl-5-propyl-2,3-dihydro-1-benzofuran-2-yl)phenol, 2-[1-hydroxy-3-(4-hydroxy-3-methoxyphenyl)propan-2-yl]-4-(3-hydroxypropyl)-6-methoxyphenol, 4-[3-(hydroxymethyl)-7-methoxy-5-propyl-2,3-dihydro-1-benzofuran-2-yl]-2,6-dimethoxyphenol, 4-(3-hydroxy-2-{2-hydroxy-3-methoxy-5-[(1E)-prop-1-en-1-yl]phenyl}propyl)-2,6-dimethoxyphenol, 4-[3-hydroxy-2-(2-hydroxy-3-methoxy-5-propylphenyl)propyl]-2,6-dimethoxyphenol, 4-{3-hydroxy-2-[2-hydroxy-5-(3-hydroxypropyl)-3-methoxyphenyl]propyl}-2,6-dimethoxyphenol, 5,5'-diethyl-3,3'-dimethoxy-[1,1'-biphenyl]-2,2'-diol, 5-ethyl-3,3'-dimethoxy-5'-propyl-[1,1'-biphenyl]-2,2'-diol, 3,3'-dimethoxy-5,5'-bis[(1E)-prop-1-en-1-yl]-[1,1'-biphenyl]-2,2'-diol, 3,3'-dimethoxy-5-[(1E)-prop-1-en-1-yl]-5'-propyl-[1,1'-biphenyl]-2,2'-diol, 3,3'-dimethoxy-5,5'-dipropyl-[1,1'-biphenyl]-2,2'-diol, 2-methoxy-4-[1-(2-methoxy-4-propylphenoxy)propyl]phenol, 4-[1-(2,6-dimethoxy-4-propylphenoxy)propyl]-2-methoxyphenol, 4-{1-[4-(3-hydroxypropyl)-2-methoxyphenoxy]propyl}-2,6-dimethoxyphenol, 4-[1-(2,6-dimethoxy-4-propylphenoxy)propyl]-2,6-dimethoxyphenol, 4-(2-{2,6-dimethoxy-4-[(1E)-prop-1-en-1-yl]phenoxy}-1-hydroxyethyl)-2,6-dimethoxyphenol, 4-[2-(2,6-dimethoxy-4-propylphenoxy)-1-hydroxyethyl]-2,6-dimethoxyphenol, 2-methoxy-6-(2-methoxy-4-propylphenoxy)-4-propylphenol, 2-[4-(3-hydroxypropyl)-2-methoxyphenoxy]-6-methoxy-4-propylphenol, 2-(2,6-dimethoxy-4-propylphenoxy)-6-methoxy-4-propylphenol, 4-[4-(4-hydroxy-3,5-dimethoxyphenyl)-hexahydrofuro[3,4-c]furan-1-yl]-2,6-dimethoxyphenol, [(1E)-2-phenylethenyl]benzene, (2-phenylethyl)benzene, (2-phenylpropyl)benzene, 4-[(1E)-2-(4-hydroxyphenyl)ethenyl]phenol, 4-[2-(4-hydroxyphenyl)ethyl]phenol, 4-[2-(4-hydroxyphenyl)propyl]phenol, 1-(2-phenylethyl)-3-[(1E)-prop-1-en-1-yl]benzene, 1-(2-phenylethyl)-3-propylbenzene, 4-(2-{3-[(1E)-prop-1-en-1-yl]phenyl}ethyl)phenol, 1-(1-phenylpropan-2-yl)-3-propylbenzene, 4-[2-(3-propylphenyl)ethyl]phenol, 2-[1-(4-hydroxyphenyl)propan-2-yl]-4-propylphenol, 3,3'-diethyl-1,1'-biphenyl, 3-ethyl-3'-propyl-1,1'-biphenyl, 3,3'-dipropyl-1,1'-biphenyl, 5,5'-diethyl-[1,1'-biphenyl]-2,2'-diol, 5-ethyl-5'-propyl-[1,1'-biphenyl]-2,2'-diol, 5,5'-dipropyl-[1,1'-biphenyl]-2,2'-diol, 1-propyl-3-(4-propylphenoxy)benzene, 4-propyl-2-(4-propylphenoxy)phenol, (2,3-dim ethyl-4-phenylbutyl)benzene, and/or 4-[4-(4-hydroxyphenyl)-2,3-dimethylbutyl]phenol. These exemplary dimer compounds, their linkage types, and their molecular weights are listed in FIGS. 4 and 5.

Examples of lignin-derived trimers that may fall within the characteristic GPC peak 3 shown in FIGS. 2 and 3, according to some embodiments of the present disclosure, include 4-[4-(4-hydroxy-3,5-dimethoxyphenyl)-hexahydrofuro[3,4-c]furan-1-yl]-2-methoxy-6-(2-methoxy-4-propylphenoxy)phenol, 4-(1-{4-[1-(2,6-dimethoxy-4-propylphenoxy)propyl]-2,6-dimethoxyphenoxy}propyl)-2-methoxyphenol, 2,6-dimethoxy-4-{7-methoxy-5-[1-(2-methoxy-4-propylphenoxy)propyl]-3-methyl-2,3-dihydro-1-benzofuran-2-yl}phenol, 5-[4-(4-hydroxy-3-methoxyphenyl)-hexahydrofuro[3,4-c]furan-1-yl]-3,3'-dimethoxy-5'-propyl-[1,1'-biphenyl]-2,2'-diol, 3,3'-dimethoxy-5-(7-methoxy-3-methyl-5-propyl-2,3-dihydro-1-benzofuran-2-yl)-5'-propyl-[1,1'-biphenyl]-2,2'-diol, 4-[1-

(2,6-dimethoxy-4-propyl phenoxy)propyl]-2-methoxy-6-(2-methoxy-4-propylphenoxy)phenol, 4-{4-[4-(2-hydroxy-3-methoxy-5-propylphenoxy)-3,5-dimethoxyphenyl]-hexahydrofuro[3,4-c]furan-1-yl}-2,6-dimethoxyphenol, 4-[1-(4-hydroxy-3-methoxyphenyl)propan-2-yl]-2-methoxy-6-(2-methoxy-4-propylphenoxy)phenol, 5-[1-(4-hydroxy-3,5-dimethoxyphenyl)propan-2-yl]-3,3'-dimethoxy-5'-propyl-[1,1'-biphenyl]-2,2'-diol, 5-[1-(2,6-dimethoxy-4-propylphenoxy)propyl]-3,3'-dimethoxy-5'-propyl-[1,1'-biphenyl]-2,2'-diol, 2-{4-[2-(4-hydroxy-3,5-dimethoxyphenyl)propyl]-2-methoxyphenoxy}-6-methoxy-4-propylphenol, 4-(1-{4-[1-(4-hydroxy-3-methoxyphenyl)prop oxy]-3,5-dimethoxyphenyl}propan-2-yl)-2,6-dimethoxyphenol, 4-{5-[1-(2,6-dimethoxy-4-propylphenoxy)propyl]-7-methoxy-3-methyl-2,3-dihydro-1-benzofuran-2-yl}-2,6-dimethoxyphenol, 2-methoxy-4-[7-methoxy-5-(7-methoxy-3-methyl-5-propyl-2,3-dihydro-1-benzofuran-2-yl)-3-methyl-2,3-dihydro-1-benzofuran-2-yl]phenol, 4-{2-[4-hydroxy-3-methoxy-5-(2-methoxy-4-propylphenoxy)phenyl]propyl}-2,6-dimethoxyphenol, 4-{1-[2,6-dimethoxy-4-(7-methoxy-3-methyl-5-propyl-2,3-dihydro-1-benzofuran-2-yl)phenoxy]propyl}-2-methoxyphenol, 5-[4-(4-hydroxy-3,5-dimethoxyphenyl)-hexahydrofuro[3,4-c]furan-1-yl]-3,3'-dimethoxy-5'-propyl-[1,1'-biphenyl]-2,2'-diol, 2-[2,6-dimethoxy-4-(7-methoxy-3-methyl-5-propyl-2,3-dihydro-1-benzofuran-2-yl)phenoxy]-6-methoxy-4-propyl phenol, 4-{5-[2-(4-hydroxy-3-methoxyphenyl)propyl]-7-methoxy-3-methyl-2,3-dihydro-1-benzofuran-2-yl}-2,6-dimethoxyphenol, 4-(1-{4-[1-(2,6-dimethoxy-4-propylphenoxy)propyl]-2-methoxyphenoxy}propyl)-2,6-dimethoxyphenol, 2-(2,6-dimethoxy-4-propylphenoxy)-4-[1-(4-hydroxy-3-methoxyphenyl)propan-2-yl]-6-methoxyphenol, 2-(2,6-dimethoxy-4-propylphenoxy)-6-methoxy-4-(7-methoxy-3-methyl-5-propyl-2,3-dihydro-1-benzofuran-2-yl)phenol, 2-{4-[2-(4-hydroxy-3,5-dimethoxyphenyl)propyl]-2,6-dimethoxyphenoxy}-6-methoxy-4-propylphenol, 5-[2-(4-hydroxy-3,5-dimethoxyphenyl)propyl]-3,3'-dimethoxy-5'-propyl-[1,1'-biphenyl]-2,2'-diol, 4-{2-[4-(2-hydroxy-3-methoxy-5-propylphenoxy)-3,5-dimethoxyphenyl]propyl}-2,6-dimethoxyphenol, 2-[2-(2,6-dimethoxy-4-propylphenoxy)-6-methoxy-4-propylphenoxy]-6-methoxy-4-propylphenol, 5-[2-(4-hydroxy-3-methoxyphenyl)propyl]-3,3'-dimethoxy-5'-propyl-[1,1'-biphenyl]-2,2'-diol, 2-{4-[2-(4-hydroxy-3-methoxyphenyl)propyl]-2-methoxyphenoxy}-6-methoxy-4-propylphenol, 4-(1-{4-[1-(2,6-dimethoxy-4-propylphenoxy)propyl]-2-methoxyphenoxy}propyl)-2-methoxyphenol, 4-{4-[3-(2,6-dimethoxy-4-propylphenoxy)-4-hydroxy-5-methoxyphenyl]-hexahydrofuro[3,4-c]furan-1-yl}-2,6-dimethoxyphenol, 2-{2,6-dimethoxy-4-[1-(2-methoxy-4-propylphenoxy)propyl]phenoxy}-6-methoxy-4-propylphenol, 2,6-dimethoxy-4-{1-[2-methoxy-4-(7-methoxy-3-methyl-5-propyl-2,3-dihydro-1-benzofuran-2-yl)phenoxy]propyl}phenol, 4-(1-{4-[1-(4-hydroxy-3-methoxyphenyl)propoxy]-3-methoxyphenyl}propan-2-yl)-2,6-dimethoxyphenol, 1-(1-phenylpropan-2-yl)-3-(2-phenylpropyl)benzene, 4-(2-{3-[2-(4-hydroxyphenyl)propyl]phenyl}propyl)phenol, 1-(1-phenylpropan-2-yl)-3-(4-propylphenoxy)benzene, 4-[1-(4-hydroxyphenyl)propan-2-yl]-2-(4-propylphenoxy)phenol, 1-(4-propylphenoxy)-3-[2-(3-propylphenyl)propyl]benzene, 2-(4-propylphenoxy)-4-[2-(3-propylphenyl)propyl]phenol, 1-[4-(2-phenylpropyl)phenoxy]-3-propylbenzene, 2-{4-[2-(4-hydroxyphenyl)propyl]phenoxy}-4-propylphenol, 3-(2-phenylpropyl)-3'-propyl-1,1'-biphenyl, 5-[2-(4-hydroxyphenyl)propyl]-5'-propyl-[1,1'-biphenyl]-2,2'-diol, 1-(1-phenylpropan-2-yl)-4-(3-propylphenoxy)benzene, 2-{4-[1-(4-hydroxyphenyl)propan-2-yl]phenoxy}-4-propylphenol, 4-propyl-1-(3-propylphenoxy)-2-(4-propylphenoxy)benzene, 4-propyl-2-[4-propyl-2-(4-propylphenoxy)phenoxy]phenol, 1-(2,3-dimethyl-4-phenylbutyl)-3-(4-propylphenoxy)benzene, 4-[4-(4-hydroxyphenyl)-2,3-dimethylbutyl]-2-(4-propylphenoxy)phenol, 1-propyl-3-{4-[2-(3-propylphenyl)propyl]phenoxy}benzene, 4-propyl-2-{4-[2-(3-propylphenyl)propyl]phenoxy}phenol, 3-(2,3-dimethyl-4-phenylbutyl)-3'-propyl-1,1'-biphenyl, 5-[4-(4-hydroxyphenyl)-2,3-dimethylbutyl]-5'-propyl-[1,1'-biphenyl]-2,2'-diol, 3-propyl-3'-[2-(3-propylphenyl)propyl]-1,1'-biphenyl, 5-propyl-5'-[2-(3-propylphenyl)propyl]-[1,1'-biphenyl]-2,2'-diol, 1-[4-(2,3-dimethyl-4-phenylbutyl)phenoxy]-3-propylbenzene, 2-{4-[4-(4-hydroxyphenyl)-2,3-dimethylbutyl]phenoxy}-4-propylphenol, 3-(1-phenylpropan-2-yl)-3'-propyl-1,1'-biphenyl, 5-[1-(4-hydroxyphenyl)propan-2-yl]-5'-propyl-[1,1'-biphenyl]-2,2'-diol, 1-(1-phenylpropan-2-yl)-3-[2-(3-propylphenyl)propyl]benzene, and/or 4-(2-{3-[2-(3-propylphenyl)propyl]phenyl}propyl)phenol. These exemplary trimer compounds, their linkage types, and their molecular weights are listed in FIGS. 6 and 7.

Examples of lignin-derived tetramers that may fall within the characteristic GPC tail 4 shown in FIGS. 2 and 3, according to some embodiments of the present disclosure, include 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol, 2'-[2-(2-hydroxy-3-methoxy-5-propyl phenoxy)-3-methoxy-5-propylphenoxy]-3,3'-dimethoxy-5,5'-dipropyl-[1,1'-biphenyl]-2-ol, 5-{1-[3-(2,6-dimethoxy-4-propylphenoxy)-4-hydroxy-5-methoxyphenyl]propan-2-yl}-3,3'-dimethoxy-5'-propyl-[1,1'-biphenyl]-2,2'-diol, 4-[1-(2,6-dimethoxy-4-{7-methoxy-5-[1-(2-methoxy-4-propyl phenoxy)propyl]-3-methyl-2,3-dihydro-1-benzofuran-2-yl}phenoxy)propyl]-2-methoxyphenol, 4-[4-(4-hydroxy-3-{4-[2-(4-hydroxy-3-methoxyphenyl)propyl]-2,6-dimethoxyphenoxy}-5-methoxyphenyl)-hexahydrofuro[3,4-c]furan-1-yl]-2,6-dimethoxyphenol, 5-[1-(4-hydroxy-3-methoxyphenyl)propan-2-yl]-3,3'-dimethoxy-5'-[1-(2-methoxy-4-propylphenoxy)propyl]-[1,1'-biphenyl]-2,2'-diol, 5-(2-{2',6-dihydroxy-3',5-dimethoxy-5'-propyl-[1,1'-biphenyl]-3-yl}propyl)-3,3'-dimethoxy-5'-propyl-[1,1'-biphenyl]-2,2'-diol, 2-{2,6-dimethoxy-4-[7-methoxy-5-(7-methoxy-3-methyl-5-propyl-2,3-dihydro-1-benzofuran-2-yl)-3-methyl-2,3-dihydro-1-benzofuran-2-yl]phenoxy}-6-methoxy-4-propyl phenol, 3,3'-dimethoxy-5-[7-methoxy-5-(7-methoxy-3-methyl-5-propyl-2,3-dihydro-1-benzofuran-2-yl)-3-methyl-2,3-dihydro-1-benzofuran-2-yl]-5'-propyl-[1,1'-biphenyl]-2,2'-diol, 4-{4-[4-(2-hydroxy-3-methoxy-5-propyl phenoxy)-3-methoxyphenyl]-hexahydrofuro[3,4-c]furan-1-yl}-2-methoxy-6-(2-methoxy-4-propylphenoxy) phenol, 5-[1-(2,6-dimethoxy-4-propylphenoxy)propyl]-5'-[1-(4-hydroxy-3-methoxyphenyl)propan-2-yl]-3,3'-dimethoxy-[1,1'-biphenyl]-2,2'-diol, 2-(4-{5-[1-(2,6-dimethoxy-4-propyl phenoxy)propyl]-7-methoxy-3-methyl-2,3-dihydro-1-benzofuran-2-yl}-2,6-dimethoxyphenoxy)-6-methoxy-4-propylphenol, 4-[4-(4-{1-[4-(2-hydroxy-3-methoxy-5-propylphenoxy)-3-methoxyphenyl]propoxy}-3-methoxyphenyl)-hexahydrofuro[3,4-c]furan-1-yl]-2,6-dimethoxyphenol, 2'-{2-hydroxy-5-[1-(4-hydroxy-3,5-dimethoxyphenyl)propan-2-yl]-3-methoxyphenoxy}-3,3'-dimethoxy-5,5'-dipropyl-[1,1'-biphenyl]-2-ol, 2-(2,6-dimethoxy-4-propylphenoxy)-4-{2-[4-hydroxy-3-methoxy-5-(2-methoxy-4-propylphenoxy)phenyl]propyl}-6-methoxyphenol, 4-[1-(4-{1-[2,6-dimethoxy-4-(7-methoxy-3-methyl-5-propyl-2,3-dihydro-1-benzofuran-2-yl)

phenoxy]propyl}-2,6-dimethoxyphenoxy)propyl]-2,6-dimethoxyphenol, 3-propyl-3'-{1-[4-(3-propylphenoxy)phenyl]propan-2-yl}-1,1'-biphenyl, 5-{1-[4-(2-hydroxy-5-propylphenoxy)phenyl]propan-2-yl}-5'-propyl-[1,1'-biphenyl]-2,2'-diol, 3',5-dipropyl-2-[5-propyl-2-(3-propylphenoxy)phenoxy]-1,1'-biphenyl, 2'-[2-(2-hydroxy-5-propylphenoxy)-5-propylphenoxy]-5,5'-dipropyl-[1,1'-biphenyl]-2-ol, 3-propyl-3'-{1-[3-(4-propylphenoxy)phenyl]propan-2-yl}-1,1'-biphenyl, 5-{1-[4-hydroxy-3-(4-propylphenoxy)phenyl]propan-2-yl}-5'-propyl-[1,1'-biphenyl]-2,2'-diol, 1-(2,3-dim ethyl-4-phenylbutyl)-3-[4-(2-phenylpropyl)phenoxy]benzene, 4-[4-(4-hydroxyphenyl)-2,3-dimethylbutyl]-2-{4-[2-(4-hydroxyphenyl)propyl]phenoxy 1 phenol, 3-propyl-3'-(2-{3'-propyl-[1,1'-biphenyl]-3-yl}propyl)-1,1'-biphenyl, 5-(242',6-dihydroxy-5'-propyl-[1,1'-biphenyl]-3-yl}propyl)-5'-propyl-[1,1'-biphenyl]-2,2'-diol, 1-propyl-3-[4-(2-{3-[2-(3-propylphenyl)propyl]phenyl}propyl)phenoxy]benzene, 4-propyl-2-[4-(2-{3-[2-(3-propylphenyl)propyl]phenyl}propyl)phenoxy]phenol, 3-propyl-3'-(2-{3-[2-(3-propylphenyl)propyl]phenyl}propyl)-1,1'-biphenyl, 5-(2-{3-[2-(3-hydroxy-5-propylphenyl)propyl]phenyl}propyl)-5'-propyl-[1,1'-biphenyl]-2,2'-diol, 1-(4-{2,3-dimethyl-4-[3-(4-propylphenoxy)phenyl]butyl}phenoxy)-3-propylbenzene, 2-(4-{4-[4-hydroxy-3-(4-propylphenoxy)phenyl]-2,3-dimethylbutyl}phenoxy)-4-propylphenol, 2-[3-(1-phenylpropan-2-yl)phenoxy]-3',5-dipropyl-1,1'-biphenyl, 2'-{2-hydroxy-5-[1-(4-hydroxyphenyl)propan-2-yl]phenoxy}-5,5'-dipropyl-[1,1'-biphenyl]-2-ol, 1-propyl-4-(3-{2-[3-(4-propylphenoxy)phenyl]propyl}phenoxy)benzene, and/or 4-{2-[4-hydroxy-3-(4-propylphenoxy)phenyl]propyl}-2-(4-propylphenoxy)phenol. These exemplary tetramer compounds, their linkage types, and their molecular weights are listed in FIG. 8.

The lists of dimers, trimers, and tetramers listed above have molecular weight ranges that may be desirable for producing mixtures thereof having physical property and/or performance characteristics suitable for use as heat transfer fluids. Desirable attributes of a HTF include, among other things, a low melting point, a high boiling point, a high heat capacity, a moderate dynamic viscosity, and/or a high thermal stability. An analysis of the lignin dimers, trimers, and tetramers targeting these desirable properties resulted in the down selected shorter lists of dimers, trimers, and tetramers shown below. For example, a moderate MW (i.e., MW<450 Da) implies a high boiling point, with lower MW compounds (e.g., MW<~350 Da) likely also featuring moderate viscosities and relatively low melting points. Further, high heat capacity and high thermal stability are expected for lignin oligomers with diaryl ether (4-O-5') and/or carbon-carbon (5-5', β-1', β-5', β-β') inter-aromatic linkages, since these inter-unit chemical bonds mimic those of commercial heat transfer fluids.

In some embodiments of the present disclosure, a lignin-derived HTF may include a dimer including at least one of 5,5'-diethyl-3,3'-dimethoxy-[1,1'-biphenyl]-2,2'-diol, 5-ethyl-3,3'-dimethoxy-5'-propyl-[1,1'-biphenyl]-2,2'-diol, 3,3'-dimethoxy-5,5'-dipropyl-[1,1'-biphenyl]-2,2'-diol, 2-methoxy-6-(2-methoxy-4-propylphenoxy)-4-propylphenol, 2-(2,6-dimethoxy-4-propylphenoxy)-6-methoxy-4-propylphenol, (2-phenyl ethyl)benzene, (2-phenylpropyl)benzene, 1-(phenylethyl)-3-propylbenzene, 1-(1-phenylpropan-2-yl)-3-propylbenzene, 3,3'-diethyl-1,1'-biphenyl, 3-ethyl-3'-propyl-1,1'-biphenyl, 3,3'-dipropyl-1,1'-biphenyl, 5,5'-diethyl-[1,1'-biphenyl]-2,2'-diol, 5-ethyl-5'-propyl-[1,1'-biphenyl]-2,2'-diol, 1-propyl-3-(4-propylphenoxy)benzene, 4-propyl-2-(4-propylphenoxy)phenol, and/or (2,3-dimethyl-4-phenylbutyl)benzene.

In some embodiments of the present disclosure, a lignin-derived HTF may include a trimer including at least one of 4-[1-(4-hydroxy-3-methoxyphenyl)propan-2-yl]-2-methoxy-6-(2-methoxy-4-propylphenoxy)phenol, 5-[1-(4-hydroxy-3,5-dimethoxyphenyl)propan-2-yl]-3,3'-dimethoxy-5'-propyl-[1,1'-biphenyl]-2,2'-diol, 5-[2-(4-hydroxy-3-methoxyphenyl)propyl]-3,3'-dimethoxy-5'-propyl-[1,1'-biphenyl]-2,2'-diol, 2-{4-[2-(4-hydroxy-3-methoxyphenyl)propyl]-2-methoxyphenoxy}-6-methoxy-4-propylphenol, 1-(1-phenylpropan-2-yl)-3-(2-phenylpropyl)benzene, 1-(1-phenylpropan-2-yl)-3-(4-propylphenoxy)benzene, 1-[4-(2-phenylpropyl)phenoxy]-3-propylbenzene, 3-(2-phenylpropyl)-3'-propyl-1,1'-biphenyl, 1-(1-phenylpropan-2-yl)-4-(3-propylphenoxy)benzene, 4-propyl-1-(3-propylphenoxy)-2-(4-propylphenoxy)benzene, 4-propyl-2-[4-propyl-2-(4-propylphenoxy)phenoxy]phenol, 3-(2,3-dimethyl-4-phenylbutyl)-3'-propyl-1,1'-biphenyl, 3-propyl-3'-[2-(3-propylphenyl)propyl]-1,1'-biphenyl, 1-[4-(2,3-dimethyl-4-phenylbutyl)phenoxy]-3-propylbenzene, and/or 3-(1-phenylpropan-2-yl)-3'-propyl-1,1'-biphenyl.

In some embodiments of the present disclosure, a lignin-derived HTF may include a tetramer including at least one of 3-propyl-3'-{1-[4-(3-propylphenoxy)phenyl]propan-2-yl}-1,1'-biphenyl, 3-propyl-3'-(2-{3'-propyl-[1,1'-biphenyl]-3-yl}propyl)-1,1'-biphenyl, and/or 2-[3-(1-phenylpropan-2-yl)phenoxy]-3',5-dipropyl-1,1'-biphenyl.

Finally, the analysis evaluated which lignin-derived dimers, trimers, and/or tetramers were identified as being potentially in high abundance. In highest abundance were the dimers 2-[2-(4-hydroxy-3,5-dimethoxyphenyl)ethyl]-6-methoxy-4-propylphenol, 3,3'-dimethoxy-5,5'-di propyl-[1,1'-biphenyl]-2,2'-diol, and 2-(2,6-dimethoxy-4-propylphenoxy)-6-methoxy-4-propylphenol. Two additional dimers that were present in relatively high abundance are 3,3'-dipropyl-1,1'-biphenyl and 4-[2-(4-hydroxy-3,5-dimethoxyphenyl)ethyl]-2,6-dimethoxyphenol. Two trimers identified to be present in high abundance are 4-[4-(4-hydroxy-3,5-dimethoxyphenyl)-hexahydrofuro[3,4-c]furan-1-yl]-2-methoxy-6-(2-methoxy-4-propylphenoxy)phenol and 1-(2,3-dimethyl-4-phenylbutyl)-3-(4-propylphenoxy)benzene. Two tetramers identified to be present in high abundance are 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol and 3-propyl-3'-{1-[4-(3-propylphenoxy)phenyl]propan-2-yl}-1,1'-biphenyl.

An exemplary mixture prepared according to some embodiments of the present disclosure revealed (i) a moderate to high MW range in a range between about 200 Da and about 750 Da corresponding to dimers, trimers, and tetramers; (ii) a high degradation temperature up to a maximum temperature between about 260° C. and about 400° C., or between about 270° C. and about 290° C.; and/or (iii) a high heat capacity between about 0.5 kJ/kg·° C. and about 4.0 kJ/kg·° C., or between about 1.0 kJ/kg·° C. and about 2.0 kJ/kg·° C.

Whether or not a reactant or product described herein is "bioderived" and/or "lignin-derived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon ($^{14}C$) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pMC value obtained correlates directly to the amount of biomass material present in the sample. Thus, ASTM-D866 may be used to validate that the compositions described herein are and/or are not derived from renewable sources.

EXAMPLES

Example 1

A composition comprising: a lignin-derived mixture comprising at least one of a dimer, a trimer, or a tetramer, wherein: the composition is characterized by a thermal stability up to a maximum temperature between about 260° C. and about 300° C.

Example 2

The composition of Example 1, further comprising a heat capacity between about 0.5 kJ/kg·° C. and about 4.0 kJ/kg·° C.

Example 3

The composition of Example 1, further comprising a molecular weight between about 200 Da and about 750 Da.

Example 4

The composition of Example 1, further comprising a dynamic viscosity between greater than zero cP and about 15 cP.

Example 5

The composition of Example 1, wherein the dimer comprises at least one of 2-[2-(4-hydroxy-3,5-dimethoxyphenyl) ethyl]-6-methoxy-4-propylphenol, 3,3'-dimethoxy-5,5'-dipropyl-[1,1'-biphenyl]-2,2'-diol, or 2-(2,6-dimethoxy-4-propylphenoxy)-6-methoxy-4-propylphenol.

Example 6

The composition of Example 1, wherein the trimer comprises at least one of 4-[4-(4-hydroxy-3,5-dimethoxyphenyl)-hexahydrofuro[3,4-c]furan-1-yl]-2-methoxy-6-(2-methoxy-4-propylphenoxy)phenol or 1-(2,3-dimethyl-4-phenylbutyl)-3-(4-propylphenoxy)benzene.

Example 7

The composition of Example 1, wherein the tetramer comprises at least one of 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol or 3-propyl-3'-{1-[4-(3-propylphenoxy)phenyl]propan-2-yl}-1,1'-biphenyl.

Example 8

A method comprising: contacting a first oil with a solvent to create a mixture comprising a light phase and a heavy phase, wherein: the solvent comprises an oxygen-containing hydrocarbon, the first oil comprises a lignin-derived compound comprising at least one of a dimer, a trimer, or a tetramer, and the contacting transfers at least a portion of the lignin-derived compound from the first oil to the light phase.

Example 9

The method of Example 8, wherein the solvent comprises at least one of an ether or a ketone.

Example 10

The method of Example 9, wherein the solvent comprises ethyl tert-butyl ether (ETBE).

Example 11

The method of Example 10, wherein the solvent comprises at least one of methyl ether, ethyl ether, n-propyl ether, isopropyl ether, n-butyl ether, isobutyl ether, methyl n-butyl ether, methyl tert-butyl ether, methyl tert-amyl ether, ethyl n-butyl ether, ethyl tert-butyl ether, ethyl tert-amyl ether, n-propyl tert-butyl ether, isopropyl tert-butyl ether, di-tert-butyl ether, diethylene glycol methyl ether, diethylene glycol ethyl ether, triethylene glycol methyl ether, ethylene glycol n-propyl ether, ethylene glycol n-butyl ether, ethylene glycol hexyl ether, ethylene glycol phenyl ether, propylene glycol methyl ether, dipropylene glycol methyl ether, propylene glycol n-propyl ether, dipropylene glycol n-butyl ether, propylene glycol phenyl ether, methyl ethyl ketone, diethyl ketone, methyl n-propyl ketone, methyl isobutyl ketone, or diisobutyl ketone.

Example 12

The method of Example 8, wherein the lignin-derived compound comprises a linkage type of at least one of bibenzyl (β-1'), alkyl aryl ether (α-O-4' and/or β-O-4'), diaryl ether (4-O-5'), phenyl coumaran (β-5') and/or heterocyclic-ring-opened β-5' derivatives, resinol (β-β') or heterocyclic-ring-opened β-β' derivatives, and/or biphenyl (5-5').

Example 13

The method of Example 12, wherein the lignin-derived compound has a boiling point between 300° C. to 450° C.

Example 14

The method of Example 12, wherein the lignin-derived compound has a heat capacity between 0.5 kJ/kg·° C. and about 4.0 kJ/kg·° C.

Example 15

The method of Example 12, wherein the lignin-derived compound has a dynamic viscosity of less than about 15 cP.

Example 16

The method of Example 15, wherein the lignin-derived compound is thermally stable up to a maximum temperature between about 260° C. and about 300° C.

Example 17

The method of Example 8, wherein the contacting is performed at a first temperature between −50° C. and 230° C.

Example 18

The method of Example 8, wherein the contacting comprises: evaporating at least a portion of the solvent to form a vapor; condensing at least a portion of the vapor to form a condensate; and returning the condensate to the mixture.

Example 19

The method of Example 8, wherein the contacting is performed for a period of time between 5 minutes and 5 hours.

Example 20

The method of Example 8, wherein, during the contacting, the first oil and solvent are present at a ratio between 1 g of first oil to 1 ml of solvent and 1 g of first oil to 100 ml of solvent.

Example 21

The method of Example 8, further comprising: drying the light phase resulting in the forming of a vapor phase and a second oil comprising the lignin-derived compound.

Example 22

The method of Example 21, further comprising distilling the second oil resulting in the forming of a lower molecular weight (MW) stream comprising the lignin-derived compound and a higher MW stream.

Example 23

The method of Example 22, wherein: the distilling is performed in a distillation column having multiple stages positioned between a bottom and an overhead, the higher MW stream exits the distillation column at the bottom, and the lower MW stream exits the distillation column at the overhead.

Example 24

The method of Example 23, wherein the bottom is maintained at a second temperature between 20° C. and 300° C.

Example 25

The method of Example 23, wherein the overhead is maintained at a third temperature that is less than the second temperature.

Example 26

The method of Example 23, wherein the overhead is maintained at a pressure between 5 mTorr and 30 mTorr.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
    a lignin-derived mixture comprising at least one of a dimer, a trimer, or a tetramer, wherein:
    the dimer, the trimer, or the tetramer comprise a linkage type of at least one of a bibenzyl (β-1') linkage, an α-O-4' alkyl aryl ether linkage, a β-O-4' alkyl aryl ether linkage, a diaryl ether (4-O-5') linkage, a phenyl coumaran (β-5') linkage, a resinol (β-β') linkage, or a biphenyl (5-5') linkage, and
    the composition is characterized by a thermal stability up to a maximum temperature between 260° C. and 300° C.

2. The composition of claim 1, further comprising a heat capacity between 0.5 kJ/kg° C. and 4.0 kJ/kg° C.

3. The composition of claim 1, further comprising a molecular weight between 200 Da and 750 Da.

4. The composition of claim 1, further comprising a dynamic viscosity between greater than zero cP and 15 cP.

5. The composition of claim 1, wherein the dimer comprises at least one of 3,3'-dimethoxy-5,5'-dipropyl-[1,1'-biphenyl]-2,2'-diol or 2-(2,6-dimethoxy-4-propylphenoxy)-6-methoxy-4-propylphenol.

6. The composition of claim 1, wherein the trimer comprises at least one of 4-[4-(4-hydroxy-3,5-dimethoxyphenyl)-hexahydrofuro[3,4-c]furan-1-yl]-2-methoxy-6-(2-methoxy-4-propylphenoxy)phenol or 1-(2,3-dimethyl-4-phenylbutyl)-3-(4-propylphenoxy)benzene.

7. The composition of claim 1, wherein the tetramer comprises at least one of 5-{1-[4-(2-hydroxy-3-methoxy-5-propylphenoxy)-3,5-dimethoxyphenyl]propan-2-yl}-3,3'-dimethoxy-5'-propyl-[1,1'-biphenyl]-2,2'-diol or 3-propyl-3'-{1-[4-(3-propylphenoxy)phenyl]propan-2-yl}-1,1'-biphenyl.

8. A method comprising:
    contacting a first oil with a solvent to create a mixture comprising a light phase and a heavy phase, wherein:
    the solvent comprises an oxygen-containing hydrocarbon,
    the first oil comprises a lignin-derived compound comprising at least one of a dimer, a trimer, or a tetramer,
    the dimer, the trimer, or the tetramer comprise a linkage type of at least one of a bibenzyl (β-1') linkage, an α-O-4' alkyl aryl ether linkage, an β-O-4' alkyl aryl ether linkage, a diaryl ether (4-O-5') linkage, a phenyl coumaran (β-5') linkage, a resinol (β-β') linkage, or a biphenyl (5-5') linkage, and the contacting transfers at least a portion of the lignin-derived compound from the first oil to the light phase.

9. The method of claim 8, wherein the solvent comprises at least one of an ether or a ketone.

10. The method of claim 9, wherein the solvent comprises ethyl tert-butyl ether (ETBE).

11. The method of claim 8, wherein the contacting is performed at a first temperature between −50° C. and 230° C.

12. The method of claim 8, wherein the contacting comprises:
evaporating at least a portion of the solvent to form a vapor;
condensing at least a portion of the vapor to form a condensate; and
returning the condensate to the mixture.

13. The method of claim 8, wherein, during the contacting, the first oil and solvent are present at a ratio between 1 g of first oil to 1 ml of solvent and 1 g of first oil to 100 ml of solvent.

14. The method of claim 8, further comprising:
drying the light phase resulting in the forming of a vapor phase and a second oil comprising the lignin-derived compound.

15. The method of claim 14, further comprising distilling the second oil resulting in the forming of a lower molecular weight (MW) stream comprising the lignin-derived compound and a higher MW stream.

16. The method of claim 15, wherein:
the distilling is performed in a distillation column having multiple stages positioned between a bottom and an overhead,
the higher MW stream exits the distillation column at the bottom, and
the lower MW stream exits the distillation column at the overhead.

17. The method of claim 16, wherein the bottom is maintained at a second temperature between 20° C. and 300° C.

18. The method of claim 16, wherein the overhead is maintained at a third temperature that is less than the second temperature.

19. The method of claim 16, wherein the overhead is maintained at a pressure between 5 mTorr and 30 mTorr.

20. The composition of claim 1, wherein the linkage type further comprises at least one of a linkage of a heterocyclic-ring-opened β-5' derivative or a linkage of a heterocyclic-ring-opened β-β' derivative.

21. The composition of claim 20, wherein the dimer further comprises 2-[2-(4-hydroxy-3,5-dimethoxyphenyl)ethyl]-6-methoxy-4-propylphenol.

22. The method of claim 8, wherein the linkage type further comprises at least one of a linkage of a heterocyclic-ring-opened β-5' derivative or a linkage of a heterocyclic-ring-opened β-β' derivative.

23. The method of claim 22, wherein the dimer further comprises 2-[2-(4-hydroxy-3,5-dimethoxyphenyl)ethyl]-6-methoxy-4-propylphenol.

* * * * *